(12) United States Patent
Heller

(10) Patent No.: US 8,527,413 B2
(45) Date of Patent: Sep. 3, 2013

(54) METHOD AND SYSTEM FOR MOBILE BILL PRESENTMENT AND PAYMENT MESSAGING AND MARKETING

(75) Inventor: Joseph Heller, Huntington, NY (US)

(73) Assignee: Nextlevel Mobile, LLC, Syossett, NY (US)

( * ) Notice: Subject to any disclaimer, the term of this patent is extended or adjusted under 35 U.S.C. 154(b) by 0 days.

(21) Appl. No.: 13/243,126

(22) Filed: Sep. 23, 2011

(65) Prior Publication Data

US 2012/0078732 A1 Mar. 29, 2012

Related U.S. Application Data

(60) Provisional application No. 61/385,759, filed on Sep. 23, 2010.

(51) Int. Cl.
*G06Q 40/00* (2012.01)
(52) U.S. Cl.
USPC ............................................. 705/40; 705/35
(58) Field of Classification Search
USPC ............................. 705/41, 39, 40, 42, 43, 44
See application file for complete search history.

(56) References Cited

U.S. PATENT DOCUMENTS

| | | |
|---|---|---|
| 2002/0046165 A1 | 4/2002 | Kitchen et al. |
| 2005/0137948 A1 | 6/2005 | Kissner et al. |
| 2007/0027816 A1* | 2/2007 | Writer ............................ 705/65 |
| 2008/0010190 A1* | 1/2008 | Rackley, III et al. ........... 705/39 |
| 2008/0091616 A1 | 4/2008 | Helwin et al. |

FOREIGN PATENT DOCUMENTS

WO 2012/040598 3/2012

OTHER PUBLICATIONS

International Search Report dated Apr. 10, 2012 for PCT/US11/53026.
Written Opinion dated dated Apr. 10, 2012 for PCT/US11/53026.
International Preliminary Report on Patentability for PCT/US2011/053026 dated Apr. 4, 2013.

* cited by examiner

*Primary Examiner* — Ojo O Oyebisi
(74) *Attorney, Agent, or Firm* — Fleit Gibbons Gutman Bongini & Bianco PL; Martin Fleit; Paul D. Bianco

(57) ABSTRACT

A computer system and method for operating a computer system for a secure mobile bill presentment and payment system that enables bill payments to be made by a user of a mobile device, such as a cellular phone, smart phone, PDA, notebook, tablet or other network connected mobile device, a biller to send product or service messages or related information to enrolled customers in the mobile bill payment computer system, and for a biller to create a marketing broadcast for a product or service that an enrolled customer can purchase via the computer system.

6 Claims, 20 Drawing Sheets

METHOD AND SYSTEM FOR MOBILE BILL PRESENTMENT AND PAYMENT MESSAGING AND MARKETING

BACKGROUND OF THE INVENTION

1. Field of the Invention

The present invention relates to computer systems and methods for operating a computer system for a secure mobile bill presentment and payment system that enable bill payments to be made by a user of a mobile device, a biller to send product or service messages or related information to enrolled customers in the mobile bill payment computer system, and create a marketing broadcast for a product or service that an enrolled customer can purchase via the computer system.

2. Prior Art

Each month consumers pay billions of dollars to billers in a variety of ways. There are plenty of bill payment options, such as mailing checks, making in-person payments at a walk-in bill payment center, paying over the phone, using direct debit, and paying online over the Internet.

Most people have bank accounts and pay their bills with funds held by their bank. While electronic methods such as credit and debit cards are quickly gaining popularity, writing and mailing checks continues to be the most popular form of bill payment in the United States even though it is time consuming and slow to process.

Over the past several years, the emergence of electronic payment methods has seen huge growth in adoption among bill paying consumers, but not without their own problems. Many systems only offer bill payment services, with bill presentment either not addressed, or left to traditional paper billing methods.

SUMMARY OF THE INVENTION

A computer system and method for operating a computer system for a secure mobile bill presentment and payment system that enables bill payments to be made by a user of a mobile device, such as a cellular phone, smart phone, PDA, notebook, tablet or other network connected mobile device, a biller to send product or service messages or related information to enrolled customers in the mobile bill payment computer system, and for a biller to create a marketing broadcast for a product or service that an enrolled customer can purchase via the computer system.

The advantages of the computer system and method for operating a computer system for a secure mobile bill presentment and payment system will become apparent from the following detailed description of preferred embodiments taken in conjunction with the appended drawings.

DETAILED DESCRIPTION OF PREFERRED EMBODIMENTS OF THE INVENTION

Figure 1:
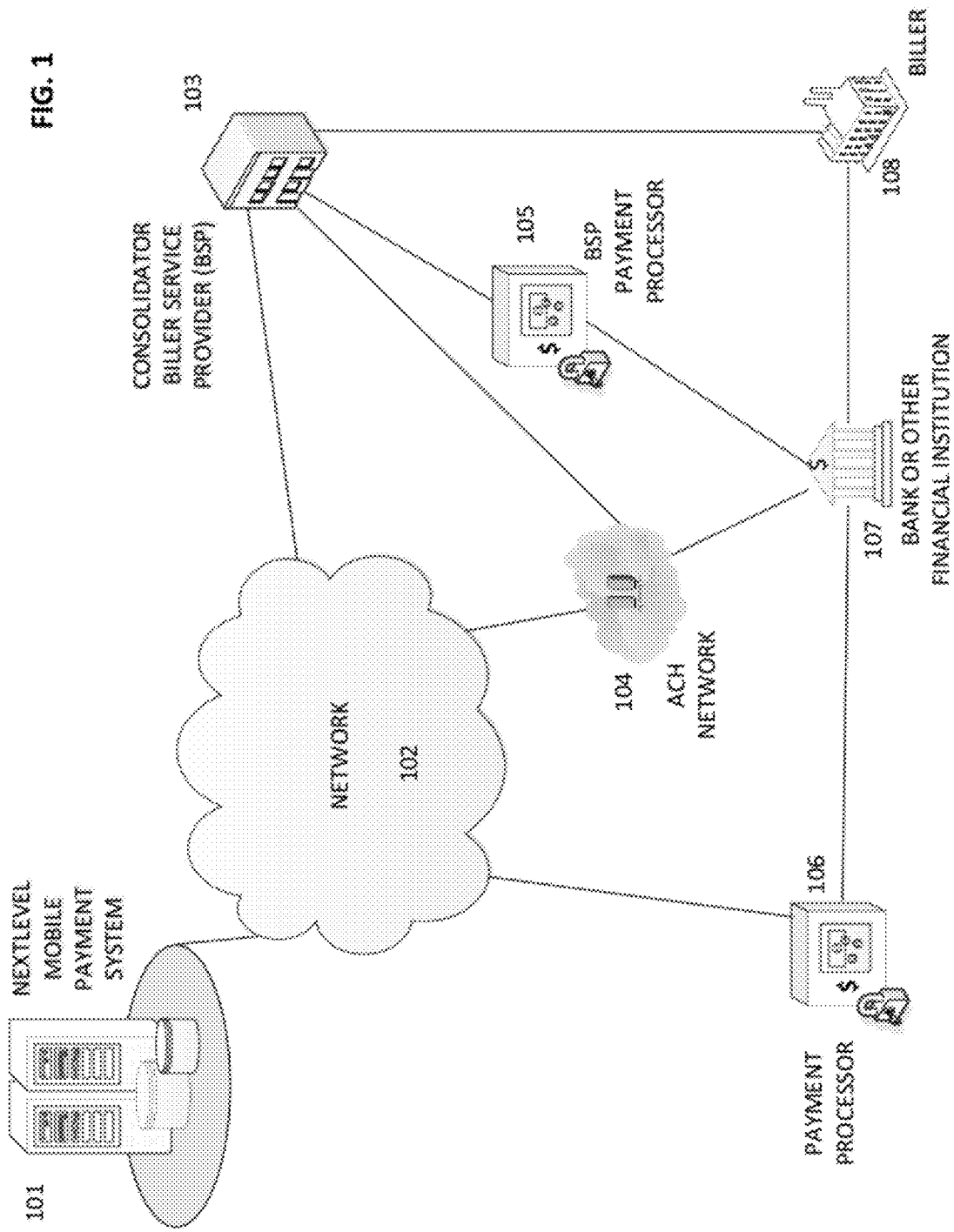
FIG. 1 illustrates schematically the computer system and method for operating a computer system for a secure mobile bill presentment and payment system and shows the entities involved, and further shows the computer system network communication between entities.

In its specific, preferred, detailed implementation, a computer system and method for operating a computer system encompasses mobile bill payment and a messaging and marketing service. A preferred embodiment encompasses a computer payment system and method for operating the computer system wherein a biller's customers can enroll with an operations center using a cell phone or another mobile device, for the purpose of bill presentment and payment. Another specific and detailed embodiment encompasses a computer payment system and method for operating the computer system wherein a biller's customer can register one or more payment methods in a secure manor using a cell phone or another mobile device. Another specific and detailed embodiment encompasses a computer payment system where an enrolled user can receive bill presentment directly to a cell phone or another mobile device. Once the bill is presented, the user can pay that bill from the cell phone or another mobile device, via the computer system, using one of the registered payment methods and receive confirmation of payment directly back to the cell phone or another mobile device. The user may choose to pay in full immediately, make a partial payment immediately, or make a full or partial payment on a specified date. The results of the authorized payment are sent back to the user's cell phone or other mobile device.

Another specific and detailed embodiment encompasses a computer system and method for operating the computer system wherein a biller can create and send product or service informational notices, via the computer system, to the cell phone or another mobile device of one or more of their customers that have enrolled with an operations center. Another specific and detailed embodiment encompasses a computer system and method for operating the computer system wherein a biller can create and send an offer for a product or a service to be purchased to the cell phone or another mobile device of one or more of their customers that have enrolled with an operations center.

Once the notice for the product or service is received, the user can purchase that product or service directly through their cell phone or another mobile device. Another specific and detailed embodiment encompasses a secure computer system and method for operating the computer system for capturing sensitive information in an SMS text messaging based application from a cell phone, where sensitive or private data is collected from the user using an interactive voice response (IVR) based system and method. The term Interactive voice response (IVR) refers to a technology that allows computers and humans to interact using dual-tone multi-frequency signaling (DTMF) via the telephone keypad or by using voice via speech recognition.

The specific and detailed embodiments can be combined in any way including all into an overall integrated computer system and method for operating the computer system.

The computer system consists of one or more mobile payment system computer operations center, each containing computer(s) programmed with software and associated components, such as telecommunications and storage systems for holding and storing the system data, and a location containing like equipment programmed with software from which control is exercised over the computers containing. The storage systems comprised of a plurality of servers that hold system data that is continually transformed and updated as transactions occur. The computer is connected to a network that may be any network that can carry computer data, for example, the Internet, Ethernet, ISDN, DSL, coaxial cable, fiber optics, plain old telephone service (POTS) line, public switched telephone network (PSTN), satellite, cellular, wired, wireless, fixed line, serial, parallel, and others not listed here, but are obvious to persons of ordinary skill in the art. Further, the computer system includes a Bill Payment Consolidator or biller service provider (BSP) entity, an agent of the biller that provides an electronic bill presentment and payment, (EBPP) service for the Biller. A bill payment consolidator entity may also consolidate bills from other bill payment consolidators and deliver them for presentment to the customer. Each consolidator and BSP entity has a computer, computer components, etc. like the mobile payment system computer operations center and is connected to the network. Both the payment system computer operations center and the consolidators are connected to a computerized ACH network operated by an Automated Clearing House (ACH) that constitutes an electronic network for financial transactions in the United States. The ACH network settles transactions through its relationships with banks and other financial institutions. ACH processes large volumes of credit and debit transactions in batches. ACH credit transfers include direct deposit payroll and vendor payments. The mobile payment system computer operations center establishes a bi-directional computerized data information feed with bill payment consolidator entities via the network. The mobile payment system's operations center also establishes a computerized data communication relationship with one or more payment processors for the purpose of performing financial transactions using credit and debit cards. Each payment processor is in turn connected to banks and other financial institutions in order to settle these transactions. The bill payment consolidator has an established relationship and data feed with one or more billers. Through this data feed, information related to customer account status, balance, billing schedule, payment notifications and payment confirmations is transmitted. In order to effect ACH transactions the bill payment consolidator also establishes a computerized data relationship with the ACH network. In order to conduct credit card and debit card transactions, the bill payment consolidator also establishes a computerized data connection to one or more payment processors. Biller entities are in communication with the banks and financial institutions.

The computer system and method for operating the computer system consist of a biller entity that sends bills to customer entities (persons or other legal entities) that pay bills directly or indirectly to the biller entity. Usually the biller entity is a company providing services to customer entities and generating periodic bills for these customer entities with a need to receive payments for those bills. In addition, the entities include one or more operations center of a payment processor entity used to house computers and associated components, such as telecommunications and storage systems, and a records location from which control is exercised over that computer. A Bill Payment Consolidator or biller service provider (BSP) entity is an agent of the biller that provides an electronic bill presentment and payment, (EBPP) service for the Biller. A bill payment consolidator entity may also consolidate bills from other bill payment consolidators and deliver them for presentment to the customer. A payment processor entity is a company (often a third party) appointed by a merchant to handle credit card transactions for merchant banks. Payment processor entities are used to charge credit cards, debit cards, and perform electronic check transactions. A BSP Payment Processor entity is the payment processor entity appointed by a consolidator or BSP entity.

An ACH network is operated by an Automated Clearing House (ACH) and constitutes a computerized electronic network for financial transactions in the United States. ACH processes large volumes of credit and debit transactions in batches. ACH credit transfers include direct deposit payroll and vendor payments.

The computer system and method of operating the computer system operates in an environment where a bill payment consolidator entity has established relationships with a number of biller entities. The bill payment consolidator entity typically offers a number of payment centers where the biller entity's customer entity can walk in and pay their bills. Because of this existing relationship, the bill payment consolidator entity already has an established information feed relating to the biller entity's customer entities and the customer's bill details, such as, account numbers and account balances. It is in this environment that the computer system and method of operating the computer system operates.

Referring now to the computer system and method of operating the computer system in detail, FIG. 1 shows schematically network data communication connections to entities involved in the operating environment. A mobile payment operations center 101 identified in FIG. 1 as NextLevel Mobile Payment System contains computers and associated components, such as telecommunications and storage devices, and a location from which control is exercised over those computers. Its storage devices comprised of a plurality of servers store and transform data relating to customers and transactions. Operations center 101 is connected to data communications network 102. This network 102 may be any network that can carry data readable by computers, for example, the Internet, Ethernet, ISDN, DSL, coaxial cable, fiber optics, plain old telephone service (POTS) line, public switched telephone network (PSTN), satellite, cellular, wired, wireless, fixed line, serial, parallel, and others not listed here, but will be apparent to persons of ordinary skill in the art.

The mobile payment system via network 102 establishes a relationship with one or more bill payment consolidator entities 103. Through the network 102, the mobile payment system's 101 operations center establishes a bi-directional data information feed between it and the bill payment consolidator entities 103. Each bill payment consolidator entity 103 has a bill payment consolidator's operations center having computer(s) programmed with software and associated components, such as telecommunications and servers for the following types of functions and information exchange:

(a) Processing of computer data with respect to new customer enrollment account numbers to validate in real time with the consolidator. The consolidator may in turn process the data of the customer account number in real time to validate with the biller.

(b) Processing of bill presentment data received from each consolidator for each user enrolled for bill payments.

(c) Processing of data with respect to "Do not accept checks" (DNAC) lists received from the consolidator for various billers to suspend the ACH transaction privileges of the biller's customers.

(d) Generate bill payment and product purchase transactions and send to the consolidator.

(e) Receive bill payment and product purchase settlement data results received from the consolidator.

(f) Transmit data with respect to new customer enrollments to the consolidator and possibly also to the biller.

(g) Receive new customer enrollments data from the consolidator

The payment consolidator is just one of the entities involved in the computerized bill payment process. The mobile bill payment operations center 101 must also establish data communication relationships with secure payment processors 106 and the automated clearing house (ACH) network 104. Although the illustration shows one occurrence of some of the entities involved, there may be any number of bill payment consolidators 103, payment processors 106, and ACH network connections 104 in a relationship with the mobile bill payment system 101.

The mobile bill payment system's 101 operations center establishes a data communications relationship with the ACH network 104 for the purpose of settling ACH transactions. The ACH network in turn settles transactions through its data communications relationships with banks and other financial institutions 107.

The mobile payment system's 101 operations center also establishes a data communications relationship with one or more payment processors 106 for the purpose of performing financial transactions using credit and debit cards. The payment processor is in turn connected to banks and other financial institutions 107 in order to settle these transactions.

The bill payment consolidator 103 has a data communications established relationship and data feed with one or more billers 108. Through this data feed, information related to customer account status, balance, billing schedule, payment notifications and payment confirmations is transmitted. In order to effect ACH transactions the bill payment consolidator 103 also establishes a relationship with the ACH network 104. In order to conduct credit card and debit card transactions, the bill payment consolidator 103 also establishes a data communications connection to one or more payment processors 105. Biller entities are in data communication with the banks and financial institutions 107.

Figure 2:
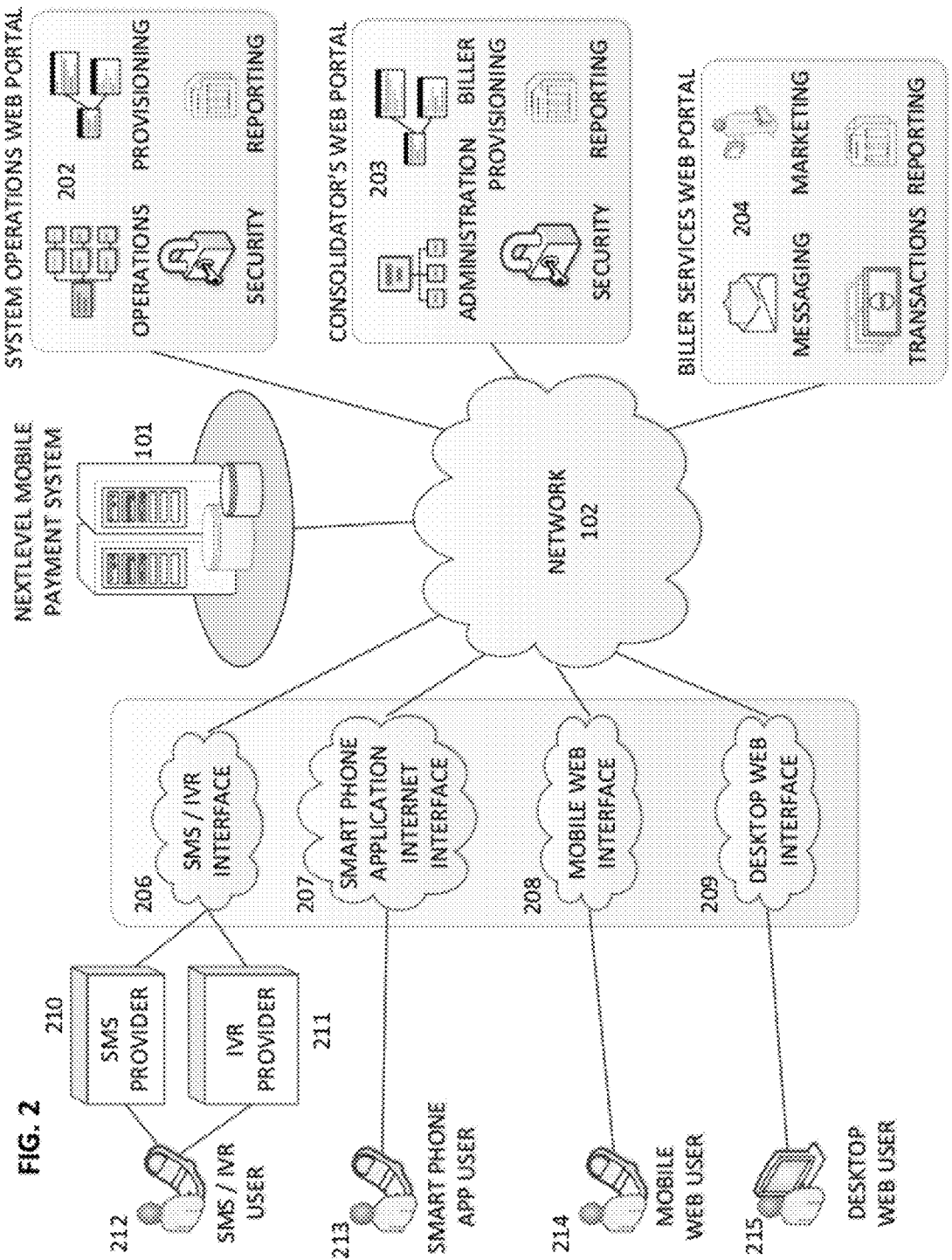
FIG. 2 illustrates schematically the computer system network communication connections regarding the interface computer system components of a user entity and the computer connections to the servers and computer components at an operations center of a payment processor entity.

FIG. 2 shows system network connections to user interface components. In a specific embodiment, bill presentment, bill payment, messaging, and marketing services are delivered. FIG. 2 shows how user interfaces 206-209 are used to access these services on mobile devices. Each of the user interfaces 206-209 may or may not be implemented on the same physical server as the rest of the mobile bill payment system in the operations center 101. They therefore communicate back to the mobile bill payment system 101 through the data communication network 102. These user interfaces are intended to be used by the customers of biller's that have enrolled with the system using a mobile device. In order to provide the greatest reach across mobile users, the computer system provides interfaces for four types of mobile device users.

(a) SMS/IVR User 212—The user of a standard cell phone (a cell phone with SMS text messaging capabilities but without smart phone capabilities, such as the ability to download and run applications on the phone).

The term text messaging refers to the short written messages exchanged between mobile or hard-lined phones and fixed or portable devices over a network. Text messages are sent using SMS, which is a store-and-forward message delivery protocol, associated with various types of systems, such as GSM, TDMA and CDMA bases mobile phone networks. Currently cell phone and other SMS devices can send text messages up to 160 alphanumeric characters to a cell phone number or Common Short Code (CSC) which identifies the recipient cell phone or network device.

The term Interactive voice response (IVR) refers to a technology that allows computers and humans to interact using dual-tone multi-frequency signaling (DTMF) via the telephone keypad or by using voice via speech recognition.

The SMS & IVR interface 206 connects to an SMS provider 210 and an IVR provider 211, which are used together to provide bill payment, messaging, and marketing services to users of these devices. The user interface consists of a series of SMS text messages delivered to and transmitted from these phones.

One of the primary drawbacks to using SMS in applications that deal with sensitive personal information is that the transmission of messages is generally sent in clear text format. As a result, it can be read by the network operator's systems and personnel. For that reason, the use of SMS is not suitable for the secure transmission of sensitive personal information such as passwords or confidential information related to financial transactions, such as credit card or bank account numbers. When the collection of sensitive information is required, the system uses IVR to place a phone call to the user's phone allowing interactions by voice and touch tone. After the sensitive information is collected the system hangs up the phone call and resumes interaction by SMS text messaging.

(b) Smart Phone User 213—The user of a smart phone (a cell phone with the ability to download and run applications, and with internet access). An application is downloaded and installed on the smartphone. The smart phone application provides the mobile bill payment, messaging, and marketing user interface and communicates over the internet to the mobile bill payment system 101 through the smart phone application internet interface 207.

(c) Mobile Web User 214—The user of a web browser that resides on a mobile phone, usually a smart phone. The mobile web interface provides a web browser implementation that is tailored to the smaller screen sizes such as those used by smart phones.

(d) Desktop Web user 215—The user of a web browser on a larger mobile device. The desktop web interface provides a web browser implementation over which users of web browsers residing on larger mobile devices can use. This web interface is tailored to the larger screen sizes of notebooks, tablets, and desktop computers.

In addition to providing four types of interfaces 206-209 for the mobile bill paying customer, there are three additional user types for which the mobile bill payment system provides interfaces for; system operators, consolidators, and billers.

In a specific embodiment a systems operations web portal 202 provides operations, provisioning, reporting and security. The systems operations web portal 202 may or may not be hosted on the same physical server as the rest of the mobile bill payment system server in the operations center. It therefore communicates with the bill payment system 101 through the network 102. The system operations web portal 202 allows the system operator to perform various system administrative tasks such as the following:

(a) Registration of new consolidators and their billers
(b) Setup security access privileges for consolidators and billers
(c) Create, modify, and update user login accounts for consolidators and billers
(d) Configure and provision consolidator and biller transaction processing rules
(e) Generate daily, weekly, and monthly reports In a specific embodiment a consolidator's web portal 203 provides biller administration, biller provisioning, reporting and security. The consolidator's web portal 203 may or may not be hosted on the same physical server as the rest of the mobile bill payment system server in the operations center. It therefore communicates with the bill payment system 101 through the network 102. The consolidator's web portal 203 is accessed by one or more consolidators and allows bill payment consolidators to perform various administrative tasks related to their billers, such as the following:

(a) Registration of new billers
(b) Setup security and access privileges for billers
(c) Create, modify, and update use login accounts for billers
(d) Configure and provision biller transaction processing rules
(e) Generate daily, weekly, and monthly reports In a specific embodiment a biller's web portal 204 provides messaging, marketing, reporting and transactions. The biller's web portal 204 may or may not be hosted on the same physical server as the rest of the mobile bill payment system server in the operations center. It therefore communicates with the bill payment system 101 through the network 102. The biller's web portal 204 is accessed by one or more billers and allows billers to perform various tasks related to their service, such as the following:

(a) Create and run messaging blasts to enrolled customers
(b) Create products and marketing message blasts to enrolled customers
(c) Recall and view payment transaction details and history
(d) Generate daily, weekly, and monthly reports Although the illustration shows one occurrence of each interface type, each interface type may service multiple users independently through that same interface.

Figure 3:
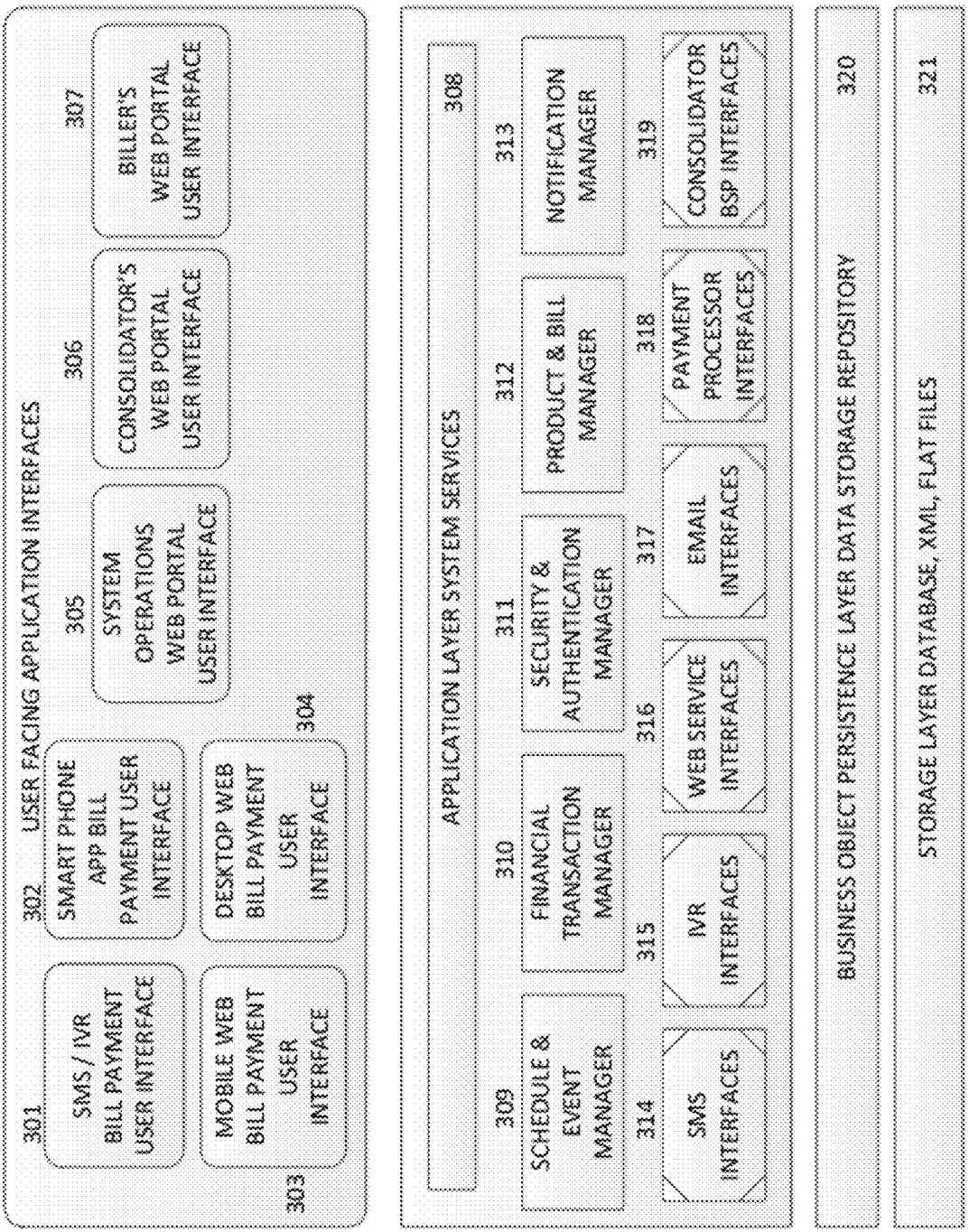
FIG. 3 illustrates schematically a layer diagram of the software running in an operations center entity for carrying out the processes necessary for controlling computer system operations.

Computer software stored on one or more servers in an operations center 101 contains the programs used. There are multiple layers of software where upper layers depend upon lower layers. FIG. 3 shows a layer diagram of the software running in the operations center 101.

The lowest layer, the storage layer 321, consists of various pieces of software that stores and manages information in a relational database. It also consists of software that manages information stored in various file formats, XML files or flat files, or any other file that is directly or indirectly accessed from a computer's file system or over a network.

Above the storage layer 321, and dependent upon it, is the business object persistence layer 320. This consists of those pieces of software that serve as an interface between the higher level system services and the storage layer 321. The function of the business object persistence layer 320 is to translate the higher level business objects, such as Users, Billers, Accounts, and Transactions into lower level SQL objects and commands for the Storage Layer 321. It is also the function of the business object persistence layer 320 to perform data retrieval operations on the data stored in the storage layer 321 and translate the data retrieved back into higher level business objects that are manipulated by the higher level computer system services.

The software is used to interface to various external services in order to carry out its function. An interface is implemented for interacting with each external service. This provides the higher level business logic layers of the system with a consistent and structured way to interact with these external services. The service interfaces include SMS interfaces 314, IVR interfaces 315, Web Service interfaces 316, Email interfaces 317, payment processor interfaces 318, consolidator interfaces 319, and others not listed here. There may be more than one instance of each type, for example, the computer system may need to interface to more than one SMS service provider, or more than one payment processor.

The SMS interfaces 314 interact with an SMS service provider operations center and allow the system to send and receive text messages over cellular networks.

The IVR interfaces 315 interact with an IVR service provider operations center and allow the system to place phone calls and interact by voice and touch tones with a user interacting with the system. The system uses the IVR interfaces 315 to collect sensitive information from a user that is using text messaging to interact with the mobile bill payment system 101.

The web service interfaces 316 are the set of interfaces related to system to system activities, such as triggering actions across systems, triggering events across systems, and the exchange of data between systems. These interfaces operate over the internet using web protocols and standards, such as HTTP, HTTPS, SOAP, REST, JSON, AJAX and other available protocols and standards.

Email Interfaces 317 allow the system to send automated emails to various parties, such as system operators, consolidators, billers, and users enrolled with the system for bill payment.

The payment processor interfaces 318 are the set of interfaces to one or more payment processors that allow the system to effect financial transactions against credit cards or debit cards. The payment processor interfaces 318 also encompass the interfaces for effecting ACH transactions through the automated clearinghouse network. It handles both the initiation of the transaction and the notification of the result of that transaction.

The consolidator BSP interfaces 319 are the set of interfaces made to various consolidators for the purpose of receiving and transmitting the following types of informational data:
 (a) Data with respect to new customer enrollment account numbers to validate in real time with the consolidator. The consolidator may in turn validate the customer account number in real time with the biller.
 (b) Data with respect to bill presentment information received from each consolidator for each user enrolled for bill payments.
 (c) Data with respect to Do not accept checks (DNAC) lists received from the consolidator for various billers to suspend the ACH transaction privileges of the biller's customers.
 (d) Data with respect to bill payment and product purchase transactions sent to the consolidator.
 (e) Data with respect to bill payment and product purchase settlement results received from the consolidator.
 (f) Data with respect to new customer enrollments sent to the consolidator and possibly also to the biller.
 (g) Data with respect to new customer enrollments received from the consolidator At the next higher layer, a number of managers implement the business logic and facilitate many of the automated system processes, such as transaction settlement, event triggering, and user notifications. This includes the schedule & event manager 309, the financial transaction manager 310, security & authentication manager 311, the product and & bill manager 312, and the notification manager 313. Being a financial transaction processing system, certain processes are required to be triggered at specific times of the month or day. The schedule & event manger 309 has the job of triggering various computer system processes at specific times during the month or during the day. Examples of these computerized processes are as follows:
 (a) Transaction settlement operations for bill payments and product purchases
 (b) Data exchange sequences between the bill payment system and the consolidator
 (c) Message transmission batches
 (d) Product marketing alerts
 (e) New bill alerts, bill reminders and late payment alerts The financial transaction manager 310 manages the process of transaction settlement for bill payments and product purchases. It coordinates with other system managers and interfaces, such as the schedule & event manager 309, payment processor interfaces 318, the consolidator BSP interfaces 319, and the notification manager 313 to perform its system functions.

The security & authentication manager 311 is a vital core system component. It uses a built-in role based security model to manage user authentication and authorization for all parts of the computer system. It also tracks and manages user sessions for logins across all user interface types, such as the web interfaces, SMS/IVR interfaces and smart phone application interfaces.

The product & bill manager 312 manages the retrieval of bill presentment informational data as obtained from the consolidator. Bill presentment informational data is either pushed to the mobile payment system's operations center from the consolidator or the mobile payment system's operations center explicitly pulls this informational data from the consolidator at designated times of the month or day. The method by which this happens usually consists of a custom interface developed for each consolidator, since consolidators rarely employ a common standard for executing such transfers. Once obtained, all users' billing records are updated and the latest payments are applied to existing bills or new bills are created and the servers are transformed with the new data. The product & bill manager 312 also manages product and promotional marketing information that a biller may create through the biller's web portal 307. The product & bill manager 312 coordinates with other system managers and interfaces, such as the schedule & event manager 309 and the notification manager 313 to perform its system functions.

The notification manager 313 handles all outbound generated messages for the following purposes:
 (a) New bill notifications
 (b) Bill reminder notifications
 (c) Late payment notifications
 (d) Biller messaging blasts
 (e) Biller product marketing blasts The notification manager 313 also routes the messages to the correct delivery mechanism based on the preferences that have been selected by the user. For example, it may route messages to a user through the SMS service, the Email service, or the route the message to a smart phone application. The notification manager 313 coordinates with other system managers and interfaces, such as the SMS interfaces 314, IVR interfaces 315, web services interfaces 316, and email interfaces 318.

The manager components and the interfaces components of the system constitute the core of the system. Above this are various user-facing application interfaces depicted by items 301-307. The user interfaces rely on the system components but do not directly interface to them. They instead interface through the application layer system services 208, which wraps the core system components and provides a uniform way for all user interface components to interface with the core services of the system.

The user application interfaces are divided into two groups; those used by bill paying customers that have registered with the system for bill payment, and those administration type interfaces intended for the system operator, the consolidator, and the biller.

The bill payment user interfaces, (depicted by items 301, 302, 303, and 304), facilitate all interactions and functionality necessary for bill paying customers to use the computer system to pay their bills in a secure and convenient manner. The SMS/IVR interface 301 allows mobile phone users without a smart phone to interact with the system using text messaging and voice or DTMF touch tones. It uses both SMS and IVR technologies together to provide a secure means of entering information. A typical user interaction is conducted by text messaging, through the SMS interfaces 314, however when sensitive information is required from the user, the system uses the IVR interface 315 to place a call to the users phone to collect this information using voice or DTMF touch tones.

This is done to collect payment information such as credit card or debit card numbers, bank routing numbers, and checking account numbers. It is also used to collect pass codes and voice print passwords.

An interface also is implemented for smart phones. In this case an application is downloaded and installed on the user's smart phone, such as an IPhone, Android phone, Windows Phone, or Blackberry phone. The application running on the smart phone communicates over the Internet using the smart phone's data connection to the smart phone application bill payment interface 302. The smart phone application and the smart phone application interface 302, communicates using secure protocols such as HTTPS to encrypt all traffic between the phone and the mobile bill payment system.

An interface is also implemented for web browsers on smart phones. The mobile web bill payment user interface 303 is a web browser based interface to the mobile bill payment system. It delivers a web interface that works well on a smart phone's smaller screen and allows the user access to all customer related bill presentment, bill payment, messaging, and marketing services of the present invention. It is also secured by the use of secure internet protocols such as HTTPS.

An interface is also implemented for web browsers on larger mobile devices. The desktop web bill payment user interface 304 is also a web browser based interface to the mobile bill payment system. It delivers a web interface that works well on a larger more standard screen size, such as a desktop computer, a notebook, or a tablet screen. It allows the user access to all customer related bill presentment, bill payment, messaging, and marketing services of the present invention. It is also secured by the use of secure internet protocols such as HTTPS.

System operators of the present invention require advanced administrative access to the system. The system operations web portal user interface 305 allows the system operator to perform various system administrative tasks such as the following:

(f) Registration of new consolidators and their billers
(g) Setup security access privileges for consolidators and billers
(h) Create, modify, and update user login accounts for consolidators and billers
(i) Configure and provision consolidator and biller transaction processing rules
(j) Generate daily, weekly, and monthly reports The consolidator's web portal user interface 306 allows consolidators to perform various administrative tasks related to their billers, such as the following:

(f) Registration of new billers and storing of informational data
(g) Setup security and access privileges for billers and storing of informational data
(h) Create, modify, and update use login accounts for billers and storing of informational data
(i) Configure and provision biller transaction processing rules and storing of informational data
(j) Generate daily, weekly, and monthly reports and storing of informational data The biller's web portal user interface 307 allows a biller to perform various tasks related to their service, such as the following:

(e) Create and run messaging blasts to enrolled customers and storing of informational data
(f) Create products and marketing message blasts to enrolled customers and storing of informational data
(g) Recall and view payment transaction details and history and storing of informational data
(h) Generate daily, weekly, and monthly reports and storing of informational data As stated earlier, the computer system operates in an environment with many entities, where these entities have established relationships with each other for the purpose of informational data transfer and computer data transaction settlement. The computer system keeps a working knowledge of the relationships of the entities in its environment to properly handle bill payment transactions. It does this by defining, storing and working with object types for each type of entity involved in the process.

This description of the present invention will now cover the entire set of object types which correspond to the business entities involved in a transaction, including the two already defined; billers and bill payment consolidators.

Biller—This entity type represents a company that provides services to customers and generates periodic bills for these customers with a need to receive payments for those bills. Each biller has an associated keyword which identifies them to their customers. The keyword is usually a shortened form of the company name. For example, a company named 'Utility Company of America' may have 'UTILCO' for its keyword.

Bill Payment Consolidator—A bill payment consolidator or biller service provider (BSP) is an agent of the biller that provides an electronic bill presentment and payment, (EBPP) service for the Biller. A bill payment consolidator may also consolidate bills from other bill payment consolidators and deliver them for presentment to the customer.

Customer—This entity type represents a person or company consuming services from a biller, and receiving bills from that biller with a need to pay.

Customer Service Provider (CSP)—A customer service provider (CSP) is an agent of the customer that provides an interface directly to customers, businesses or others for bill presentment. A CSP enrolls customers, enables presentment and payment services, among other functions.

With regard to the definitions above, the computer system is a customer service provider (CSP), where it provides bill presentment to a customer and allows bill payment services. In other respects, it is an example of a bill payment consolidator (BSP), where it consolidates the bills of many other BSPs for presentment to customers.

In addition to the entity types defined above, there are additional object types defined to support the remaining representation of real world objects and entities and to capture the relationships between the entities doing business in the real world that are stored in the servers of the computer system.

Gateway—This object type represents an access point into the system for a biller's customer enrolled with the system. There are four types of gateways which correspond to the user interface types; the SMS/IVR interface 206, the smart phone application interface 207, the mobile web interface 208, or the desktop web interface 209. The system's definition and usage of a gateway object type provides a generalized and flexible way to manage the class of these system access points and provides a way to provision the interaction methods available to users, billers, and consolidators.

Device—This represents the user entity's device through which it enrolls and interacts with the bill payments system.

Enrollment—An Enrollment object is created for each device a user enrolls with the system.

Registration—A Registration object exists to capture the consolidator's relationship with each of its Billers. A biller must register with a consolidator for bill payment services. The registration object type represents that registration. It also associates an access gateway to that registration. The associated gateway indicates how the biller's customers can access the system. The registration object also indicates the biller's keyword.

Activation—An activation object is created when an end user activates their enrollment for bill payment with a particular Biller.

Payment Method—stores information related to payment methods. The actual payment method information, such as credit card and debit card numbers, and expiration dates are stored by the payment processor, in a PCI level 1 compliant data center. What is stored in the payment method object is a token used to process transactions using the payment method. The token is received from the payment processor.

The enrollment process creates the necessary object types and the associations between them to capture the real world relationships between business entities and devices. The created objects are then passed to the business object persistence layer 320 to be stored by the storage layer 321.

Figure 4A:
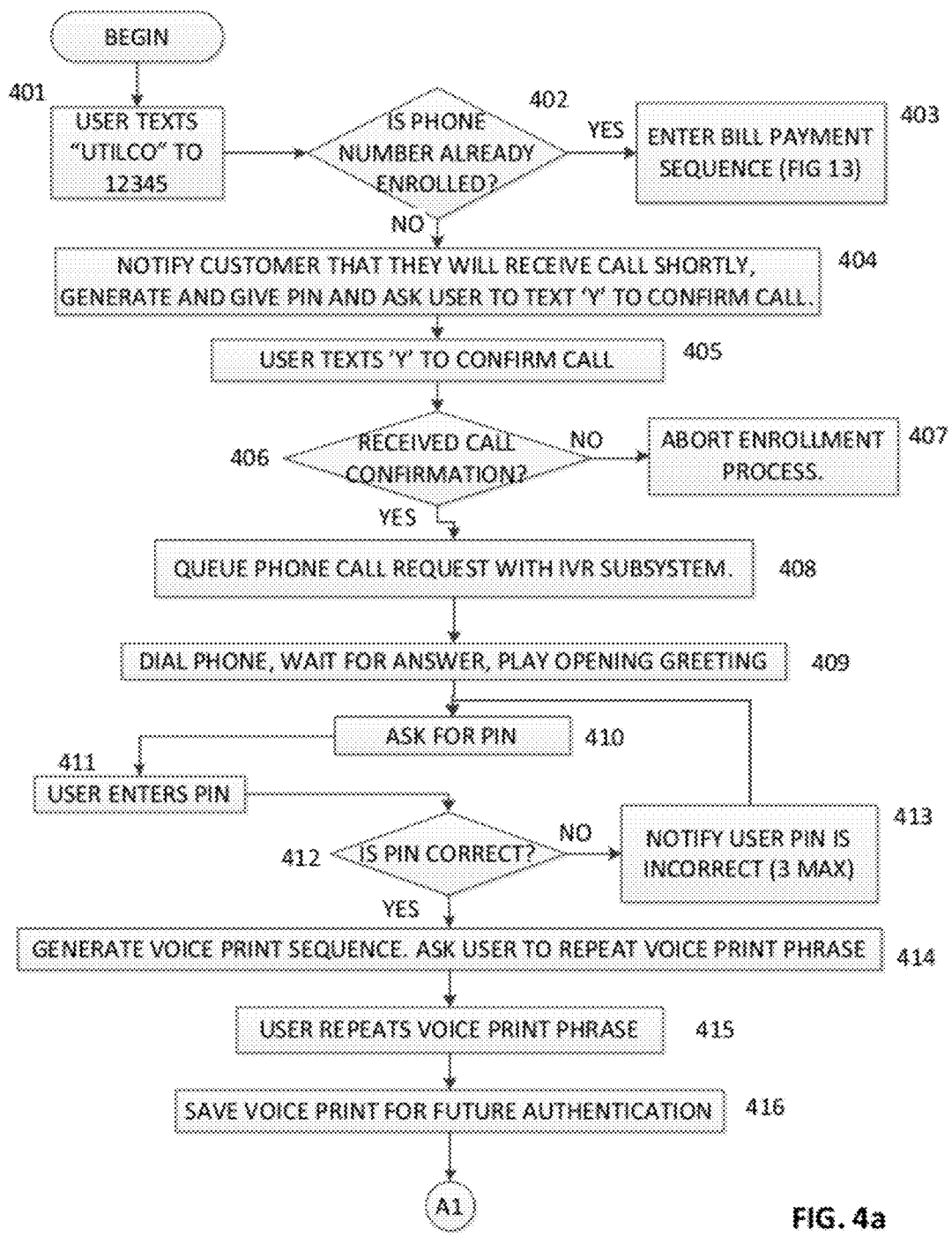
FIGS. 4a and b comprise a flow diagram showing the steps handled by the computer system using the software illustrated in FIG. 3 when registering user entity enrollment using SMS & IVR interactions.
Figure 4B:
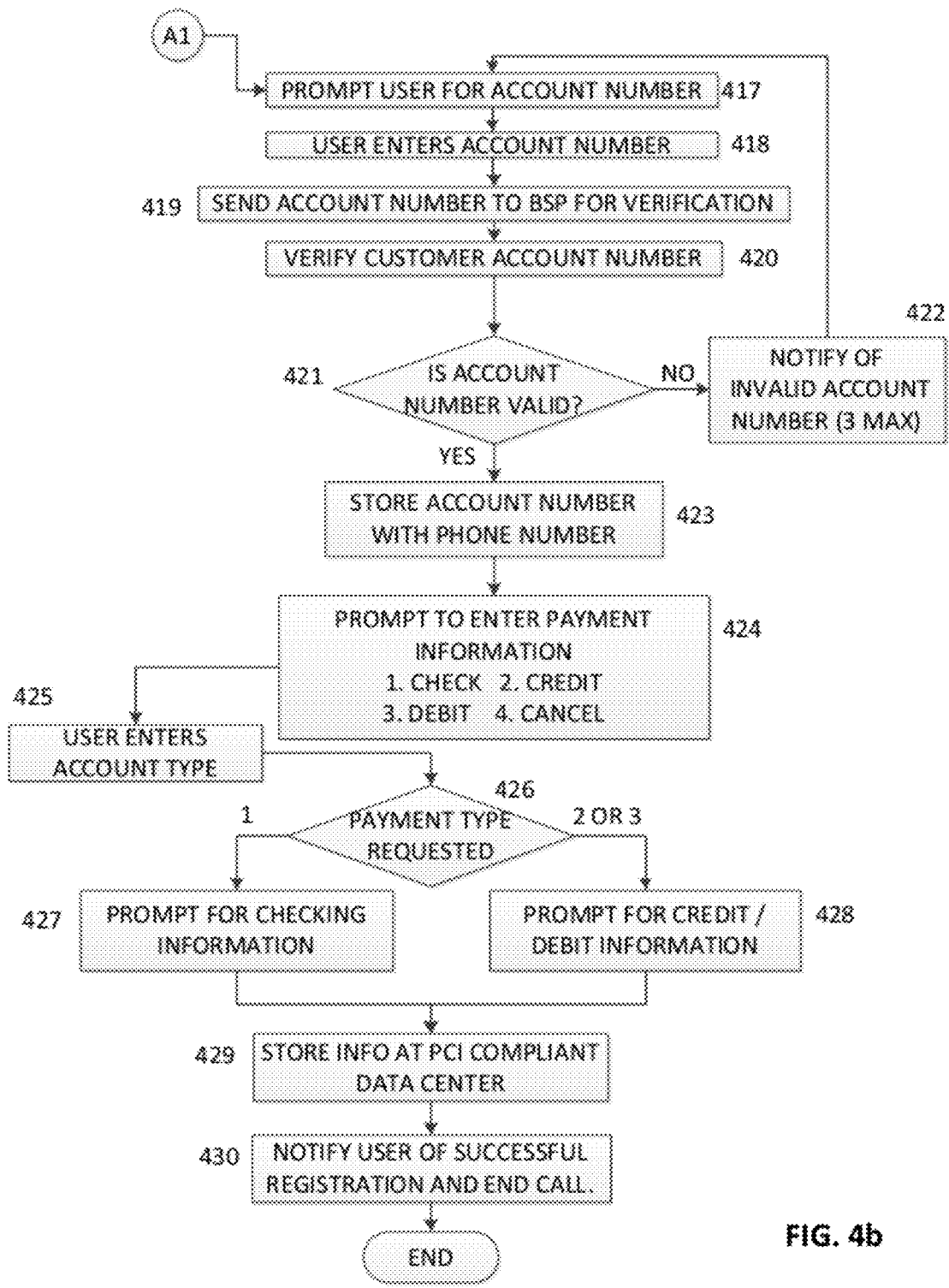

In an enrollment scenario, a user enrolls with the bill payment system using an SMS text messaging capable mobile phone. The following sequence outlines the steps carried out by the computer system using its software when a user enrolls with the system using SMS & IVR interactions (Flow chart of FIG. 4a and FIG. 4b).

Step 401—The user sends a text message containing the word keyword "UTILICO" to the SMS/IVR gateway. In this case the gateway is the short code 12345. "UTILCO" is the name of a fictitious utility company for the purposes of this example.

Step 402—The system receives text message and determines if the mobile number sending the message has already gone through the first time enrollment process.

Figure 13A:
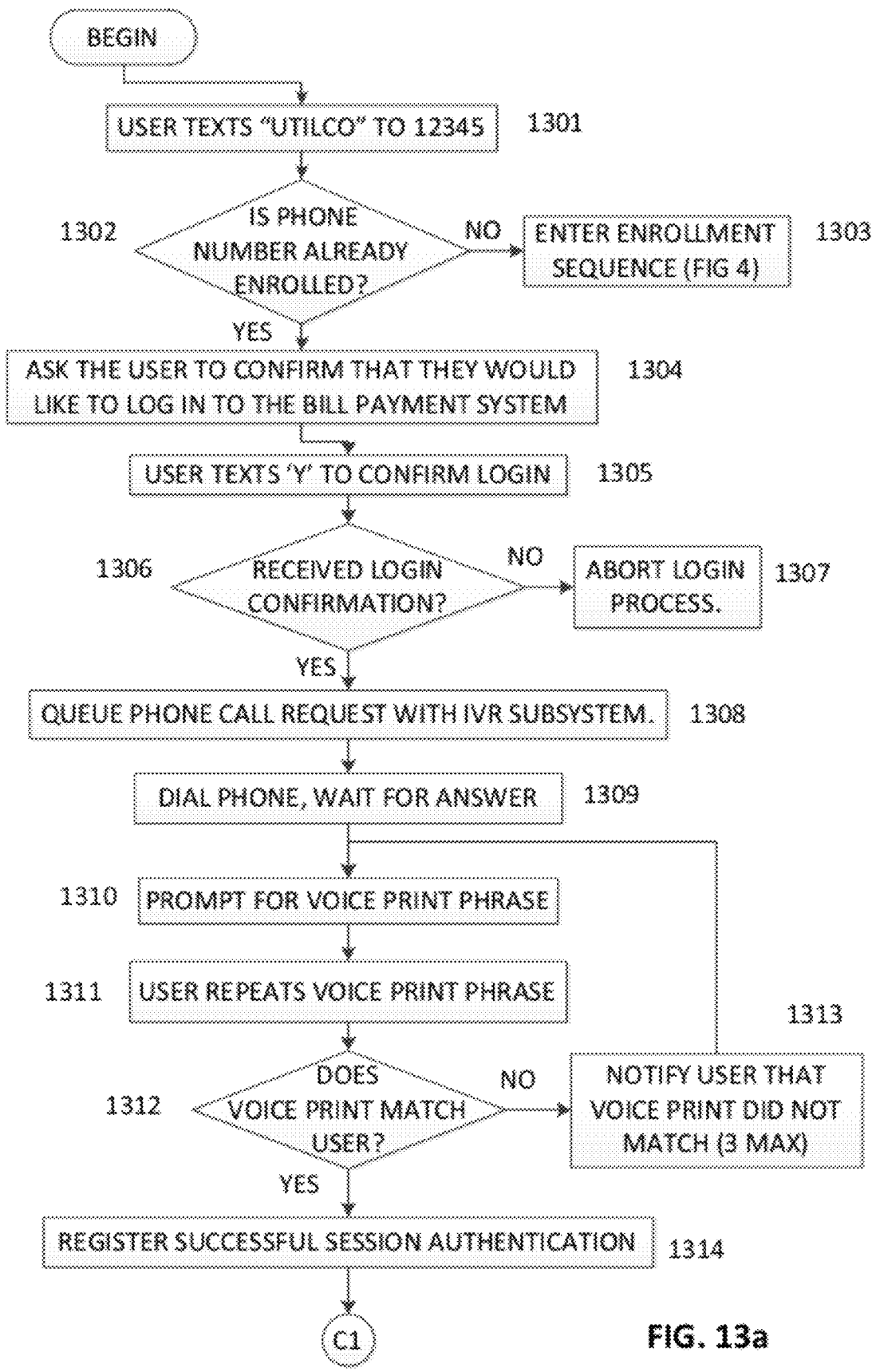
FIGS. 13a and b comprise a flow chart showing the steps handled by the computer system using software to generate, store and deliver electromagnetic data readable by the computer system when executing payment of a bill by a customer entity using SMS & IVR interaction.
Figure 13B:
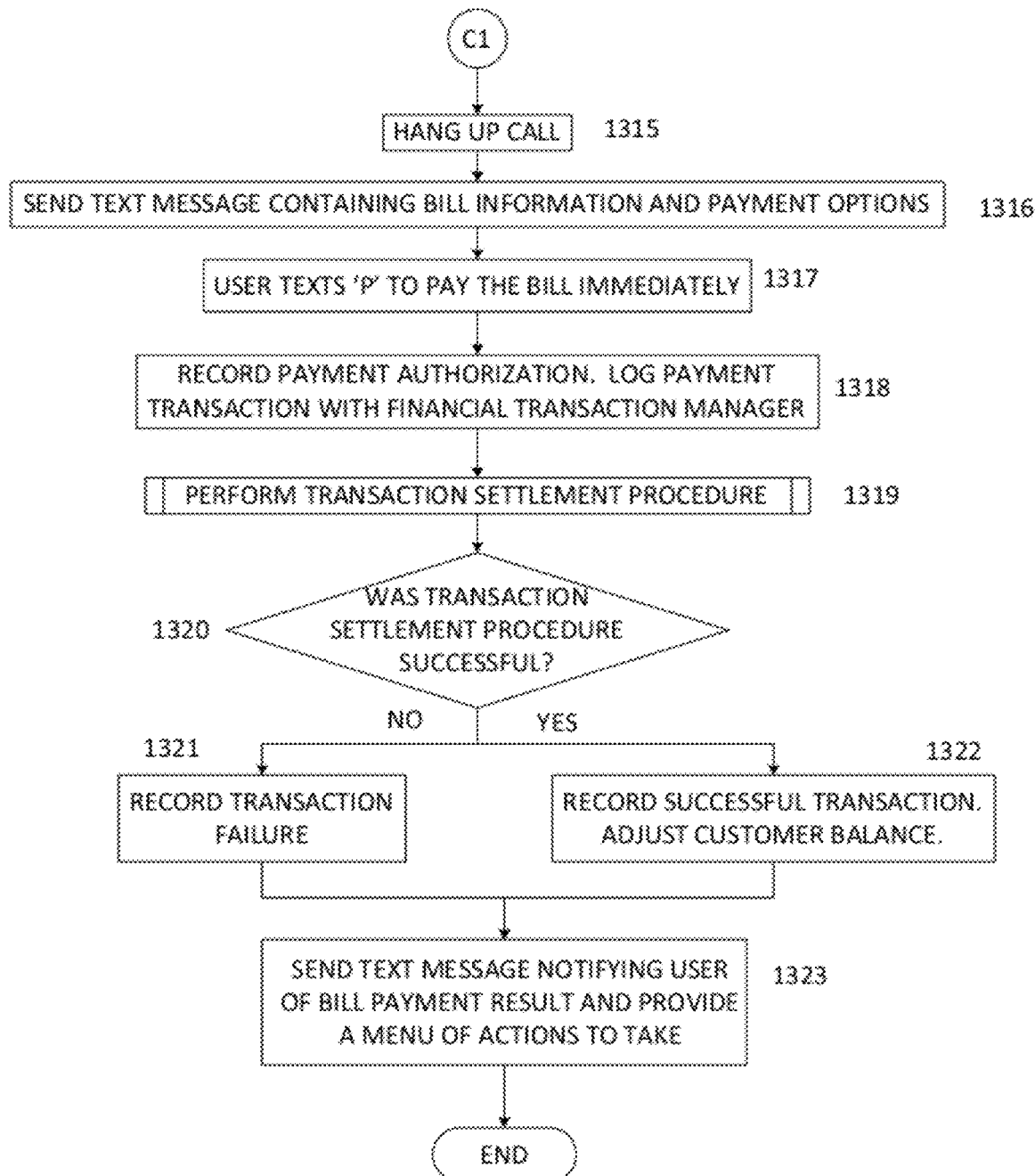

Step 403—If the user has already been enrolled, follow the method outlined in the bill payment sequence below (FIG. 13).

Step 404—Send a text message back to the user notifying them that they will receive a call shortly. Provide the user with a newly generated PIN and asks the user to grant permission to call by responding with a "Y".

Step 405—The user sends a "Y" response giving permission to call now.

Step 406—Has the user responded with a "Y"?

Step 407—The user has not responded with a "Y". Abort the enrollment process. The user will initiate the enrollment process at a later time.

Step 408—The user has granted permission to call. Queue the call request with the IVR system. A device object is created and stored to represent the device the user enrolls with. The phone number of the mobile phone is associated to the device object.

Step 409—Dial user cell phone, wait for answer, and play opening greeting.

Step 410—Ask for PIN.

Step 411—The user enters the PIN code provided in step 404.

Step 412—System determines if the PIN entered is correct.

Step 413—If incorrect let user know that the entry was not correct then ask the user to reenter the PIN and go back to step 410. System will only allow 3 incorrect attempts.

Step 414—The pin code is correct. Generate voice print sequence. Ask the user to repeat the voice print phrase.

Step 415—The user repeats the voice print phrase.

Step 416—Save voice print for future authentication. At this point the device is enrolled with the system. An enrollment object is created to represent the devices enrollment with the system. The voice print phrase and permanent pin are stored in a newly created enrollment object. The enrollment object is associated to the device object.

Alternate Step 414—Ask the user to enter a permanent PIN code for future authentication.

Alternate Step 415—The user enters the permanent PIN code.

Alternate Step 416—Save the entered permanent PIN code for future authentication. An enrollment object is created to represent the devices enrollment with the system. At this point the device is enrolled with the system. The phone number and permanent pin are stored in a newly created enrollment object. The enrollment object is associated to the device object.

Step 417—Prompt user for their Utilico account number and wait for response.

Step 418—User enters their Utilico account number.

Step 419—Send the account number to the consolidator for verification and wait for response.

Step 420—The consolidator checks the validity of the user Utilico account number to make sure that account number is a valid Utilico account number. The consolidator may optionally forward the account number to Utilico to have Utilico validate the account number. Send the validation result back to the mobile bill payment system.

Step 421—If the Utilico account number entered is valid then go to step 423. If the Utilico account number entered is not valid then the go to step 422.

Step 422—Notify the user that the entry was invalid and go back to step 417. System will only allow 3 incorrect attempts.

Step 423—System stores the account number with phone number. A Customer object is created to store the account number and the customer is associated to the biller. An activation object is also created and associated to the biller, the payment processor, the customer and the enrollment objects. At this point the enrollment has become activated for bill payments.

Step 424—System prompts the user to enter the payment method that they wish to add, 1 for check, 2 for credit card, 3 for debit card and 4 to cancel. System waits for response.

Step 425—The user enters the desired payment type.

Step 426—System determines the payment type requested and if 2 or 3 was selected go to step 428, if 1 was selected then go to step 427 or if 4 was selected abort registration.

Step 427—System prompts for and collects checking account information.

Step 428—System prompts for and collects credit or debit card information.

Step 429—System stores the payment information at a payment processor, which is also a PCI Level 1 Compliant datacenter. The system also creates a payment method object and associates it to the enrollment object.

Step 430—System plays successful registration message to user, terminates call, and sends successful registration message via text message.

In the sequence, the alternate steps for 415, 416, and 417 are used when voice fingerprinting is disabled.

In order for the enrollment scenario above to take place, the computer system is required to have pre-existing knowledge (stored informational data) of the available bill payment consolidators, billers and customers and how they are related.

The system obtains knowledge of bill payment consolidators at the time the mobile bill payment system establishes a relationship with each new consolidator. The process is involved with many manual steps, including building a new consolidator BSP interface 319 specific to each consolidator. This establishes the informational data feed between the mobile bill payments operations center and the bill payments consolidator operations center. The final step in this process is for a system operator to create and store the bill payment consolidator object using the system operator's web portal.

The system obtains knowledge of billers when the consolidator creates the biller object using the consolidator's web portal. The biller object may also be created by the system operator using the system operator's web portal. A consolidator object may be associated to zero or more biller objects, however a biller object must be associated to exactly one consolidator object.

The system obtains knowledge of customers when a user enrolls and provides a valid account number. A biller object may be associated to zero or more customer objects, however a customer object must be associated to exactly one biller object.

Figure 5:
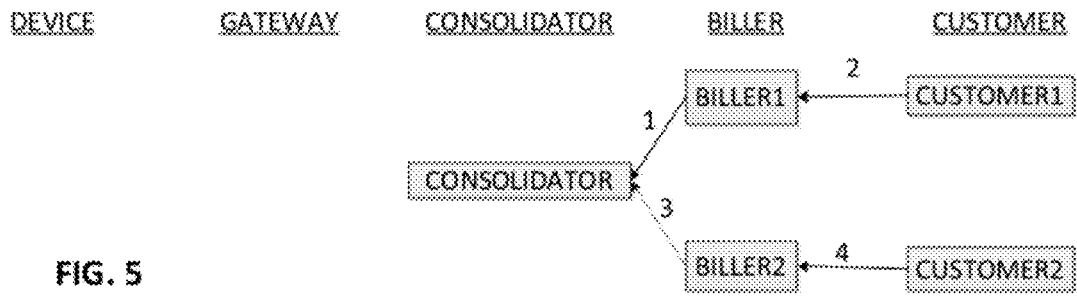
FIGS. 5-11 illustrate how the computer system establishes data structure relationships of entities and methods for capturing enrollment and bill payment activation data readable by the computer system for different scenarios.

In a fictitious scenario, depicted by FIG. 5, a consolidator is associated with two billers; biller1 and biller2 (associations 1 & 3). Each biller is associated to a single customer. Biller1 is associated 2 to customer1 and biller2 is associated 4 to customer2. In this scenario customer1 can only pay bills for bulled and customer2 can only pay bills for biller2.

Figure 6:
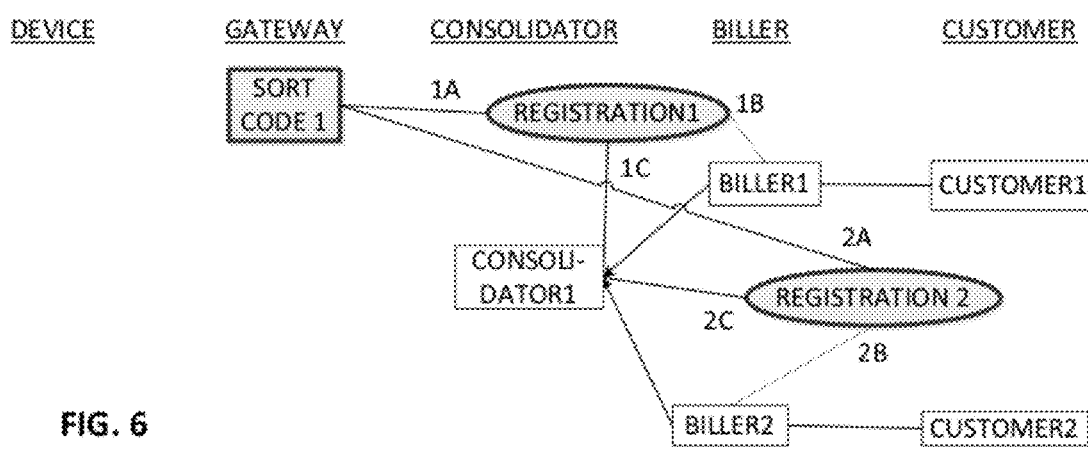

In a modification of the scenario, a few objects are added, as depicted by FIG. 6. Here, a gateway is added, which in this case is short code 1. Two registration objects are added; registration1 and registration2. Registration1 has 3 associations, 1a, 1b, and 1c, to short code 1, biller1, and consolidator1 respectively. Registration2 has 3 associations, 2a, 2b, and 2c, to short code 1, biller2, and the consolidator1 respectively. Each registration object associated to a given gateway object must have a unique keyword. At this point the system contains enough information for someone to enroll. When a keyword is sent to the gateway, in this case, short code 1, the system will search all registration objects associated with the gateway to find a match for the keyword sent. If it happens to find a match, the system will immediately know which biller and which consolidator will be involved in the payment process for the enrollment.

Figure 7:
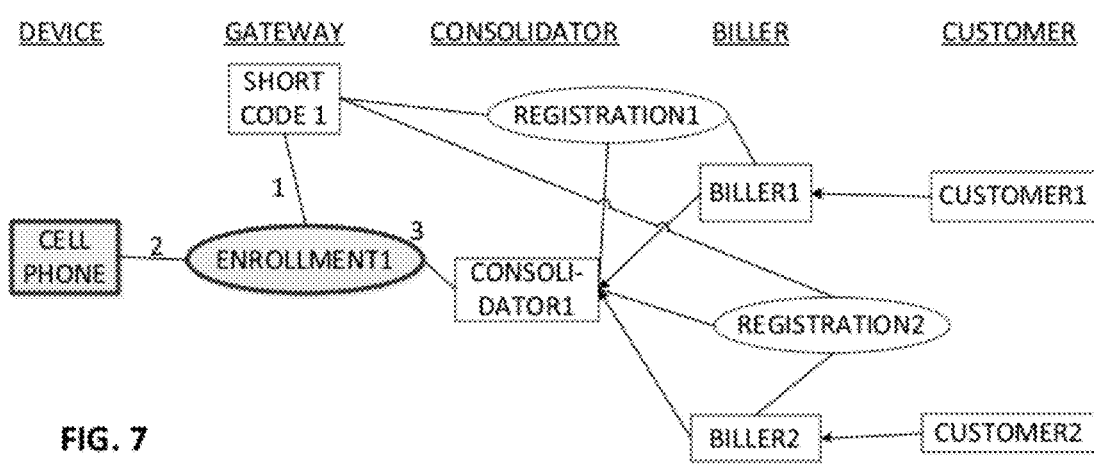

In another modification of the scenario, a few more objects have been added, as depicted by FIG. 7. Here, a device is added, which in this case is a cell phone. An enrollment object, enrollment1, has also been added. The enrollment has 3 associations, 1, 2, and 3, to short code 1, the cell phone, and consolidator1 respectively. At this point the user is enrolled with the system, but the enrollment has not been activated for bill payment.

Figure 8:
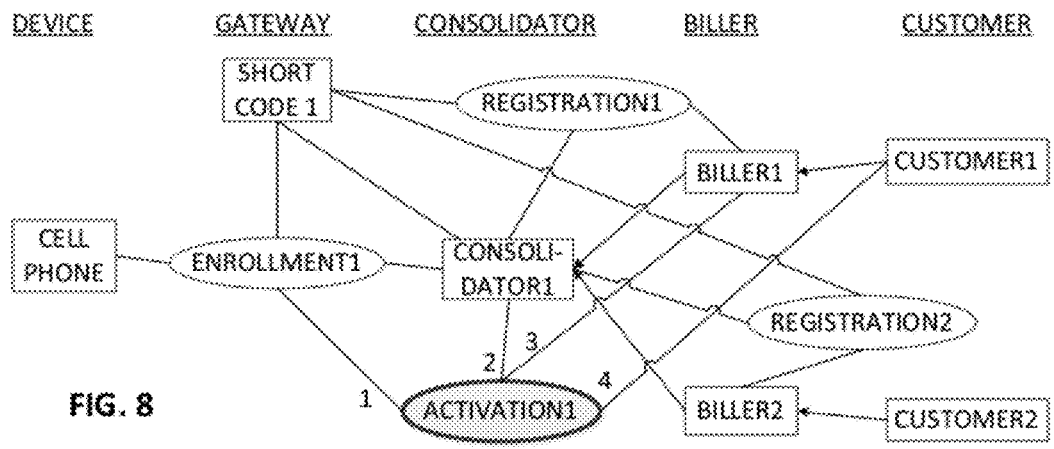

In another modification of the scenario, an additional object is added, as depicted by FIG. 8. The activation1 object has been added. Activation1 has four associations, 1, 2, 3, and 4, to enrollment1, consolidator1, biller1, and customer1, respectively. At this point, the user is fully enrolled and activated for bill payment with their account to biller1. This is the result of the enrollment sequence outlined above.

Figure 9:
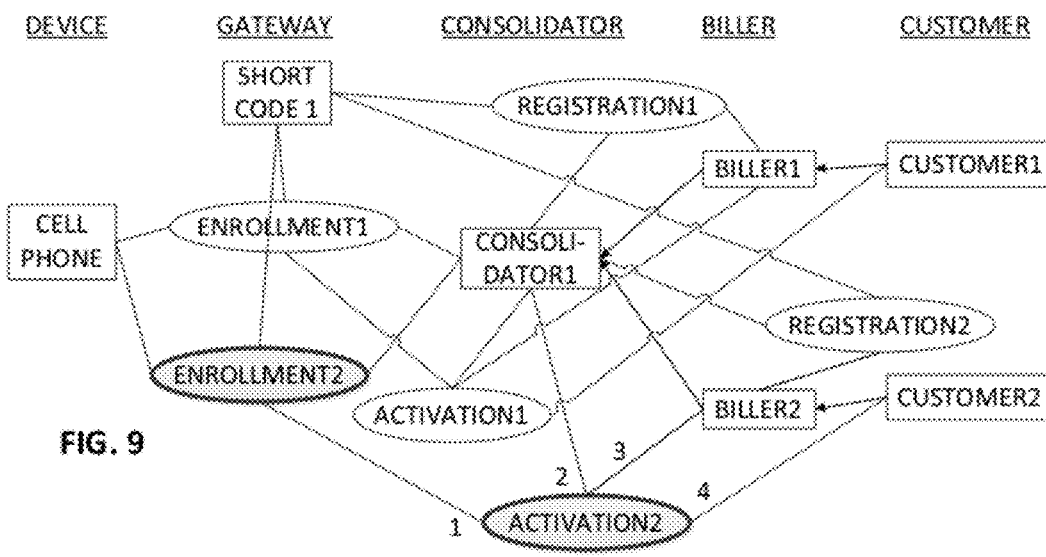

Another scenario involves the case where the user is enrolled and activated for bill payment for the customer1 account with biller1 as well as the customer2 account with biller2. FIG. 9 shows this scenario. There is an additional enrollment object, enrollment2, with associations to the user's cell phone, short code 1, and consolidator 1. There is also an activation object for the new enrollment object with four associations, 1, 2, 3, and 4, to enrollment 2, consolidator 1, biller 2, and customer2, respectively.

Figure 10:
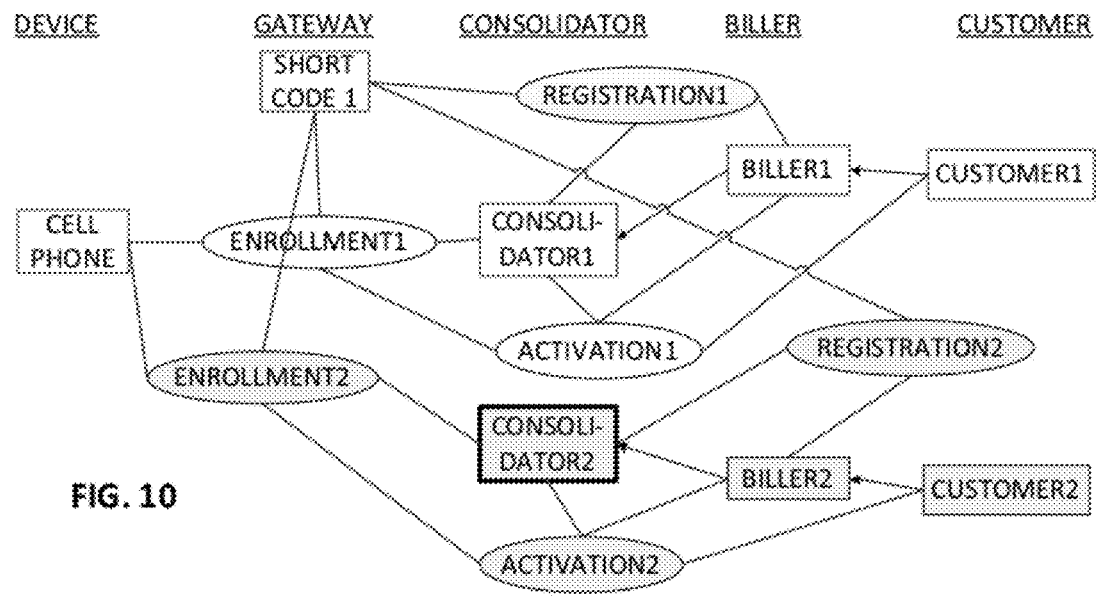

The unique way in which each real world object is represented with an object type gives the system a high degree of flexibility in which to model the complex relationships that take place in reality. The scenario may be modified once again for the case where biller2 is associated to a new consolidator. In this scenario, depicted by FIG. 10, there is a new consolidator object; consolidator 2. The biller 2 and registration 2 objects are now associated to consolidator 2 instead of consolidator 1. The enrollment 2 object is now associated to consolidator 2 instead of consolidator 1. Finally, the activation object2 is now associated to enrollment 2, consolidator 2, biller 2, and customer 2.

Figure 11:
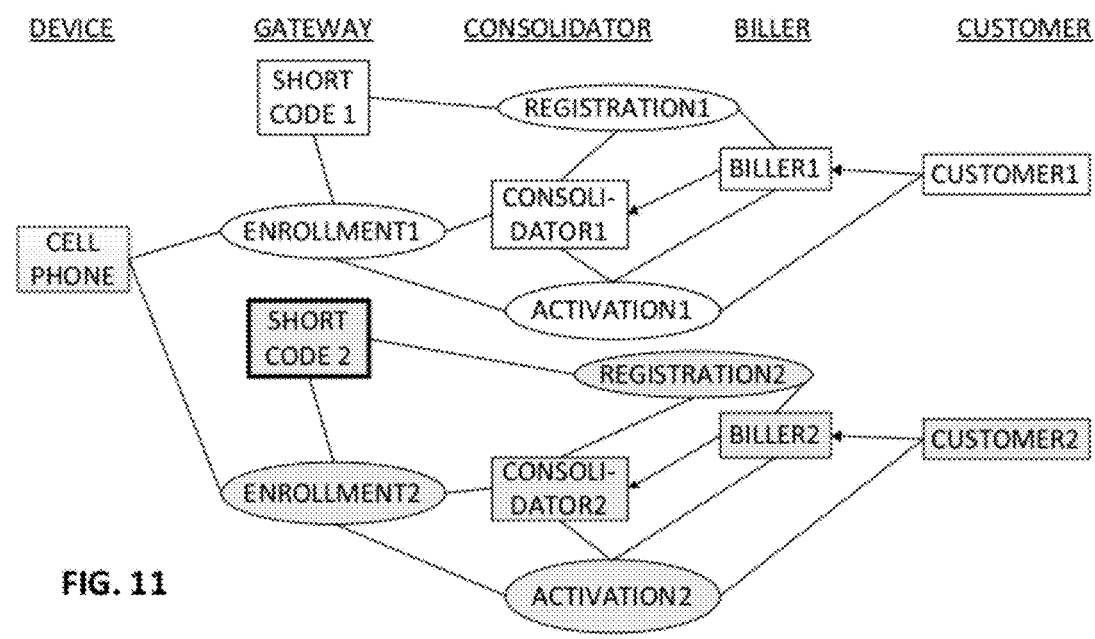

Taking the scenario further, the system can also represent the case where there is an additional gateway object, short code 2, where biller2 is registered with consolidator 2 on short code 2. In this scenario, depicted by FIG. 11, the registration 2 and enrollment 2 objects are now associated to short code 2 instead of short code 1.

Further complex relationships between objects may be modeled, as in the scenario where a device may be enrolled once, but activated for two separate billers. In this case all payment methods associated to that one enrollment object can be shared across all biller activations. The user will not need to enter payment method information for each new biller, since payment information is associated to the enrollment object.

Another scenario that may be modeled is the case where a biller or a consolidator has exclusive access to a short code.

Figure 12A:
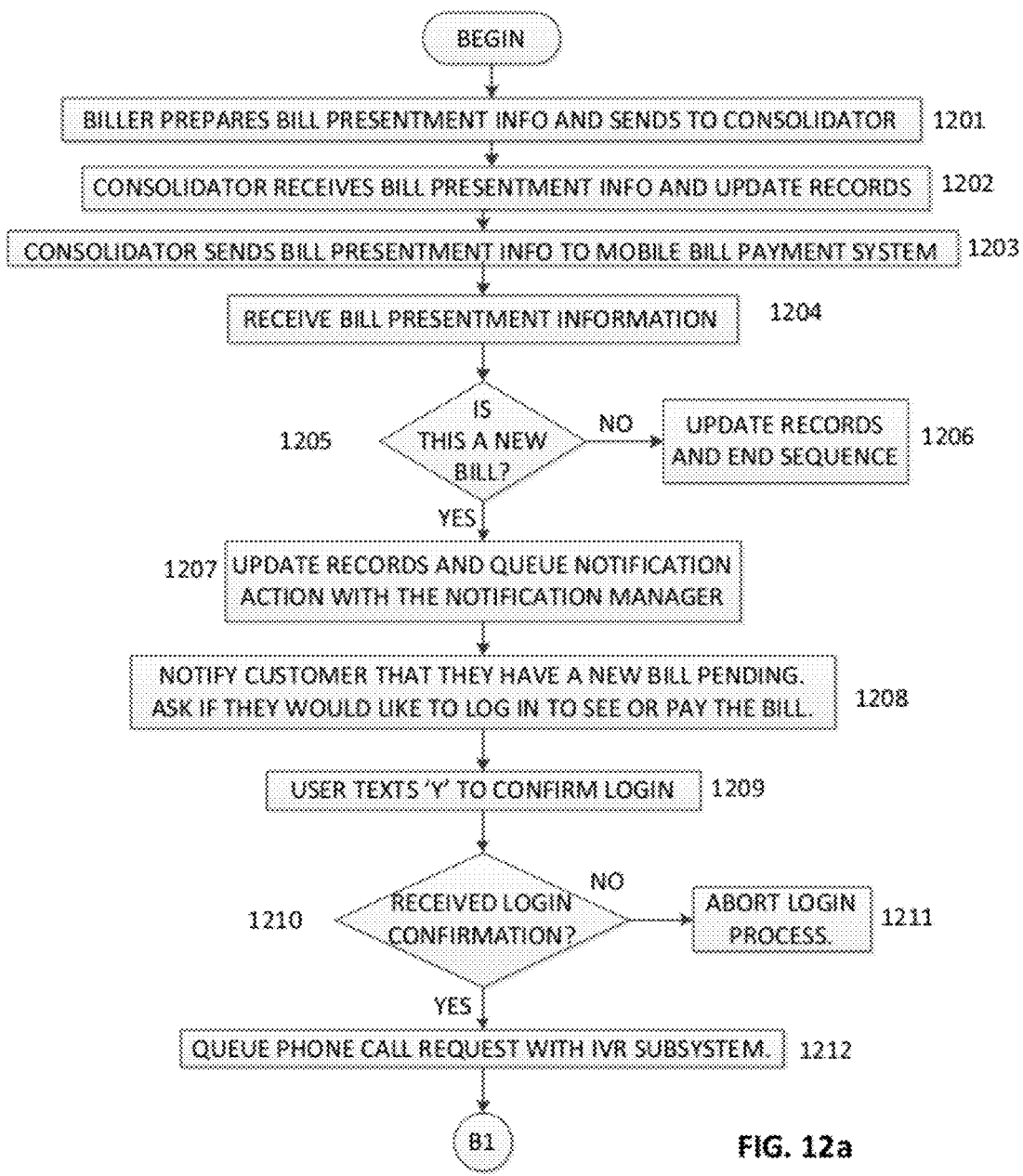
FIGS. 12a and b comprise a flow chart showing the steps handled by the computer system using software to generate, store and deliver electromagnetic data readable by the computer system when generating, storing and presenting a bill to a customer entity.
Figure 12B:
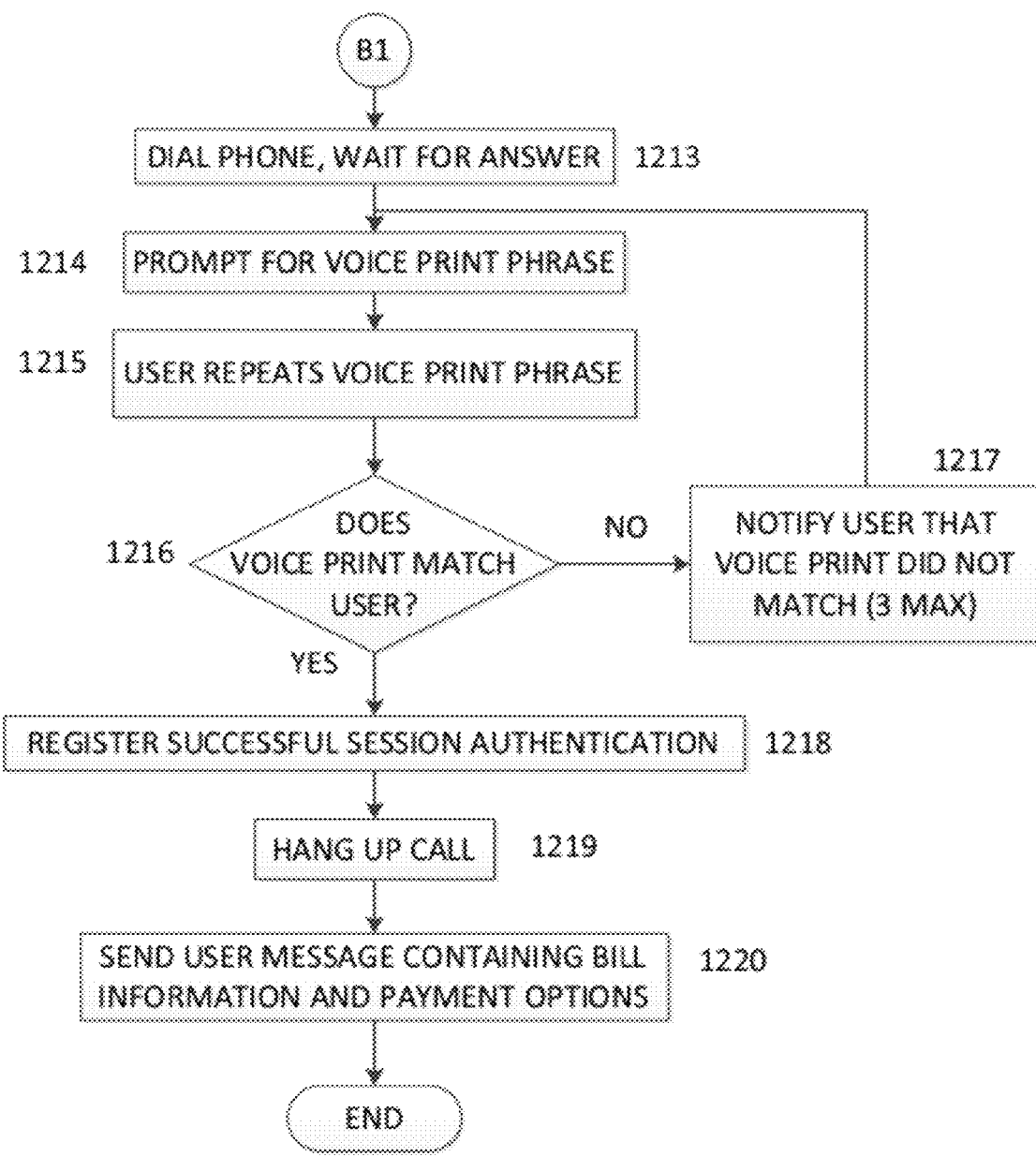

The following sequence details the method of a bill presentment to a customer as depicted by the flow chart of FIGS. 12a and b, which shows the steps carried out by the computer system using software.

Step 1201—Biller prepares bill presentment info and sends to consolidator
Step 1202—Consolidator receives bill presentment info and updates records by transforming stored data
Step 1203—Consolidator sends bill presentment info to mobile bill payment system
Step 1204—Mobile bill payment system receives bill presentment information
Step 1205—Is this a new bill?
Step 1206—No: Update records and end sequence
Step 1207—Yes: Update records and queue notification action with the notification manager
Step 1208—Notify customer that they have a new bill pending. Ask if they would like to log in to see or pay the bill.
Step 1209—User texts "Y" to confirm login
Step 1210—Have we received login confirmation?
Step 1211—No: Abort the login process
Step 1212—Yes: Queue the phone call request with the IVR subsystem
Step 1213—Dial phone and wait for answer
Step 1214—Prompt for voice print phrase
Step 1215—User repeats voice print phrase
Step 1216—Does the voice print match user?
Step 1217—No: Notify user that voice print did not match (3 Max)
Alternate Step 1214—Prompt the user for the PIN code.
Alternate Step 1215—User enters PIN code.
Alternate Step 1216—Is the PIN code correct?
Alternate Step 1217—No: Notify User that the PIN code is not correct (3 Max)

Step 1218—Yes: Register Successful session authentication
Step 1219—Hang up the call
Step 1220—Send the user message containing bill information and payment options In the sequence, the alternate steps for 1214, 1215, 1216, and 1217 are used when voice fingerprinting is disabled.

This sequence is followed by the computer system each time an enrolled customer receives a new bill from the biller. It may also be followed for cases when the computer system generates bill reminders and late payment notices.

The following sequence details the method of a bill payment scenario using SMS & IVR interaction as depicted by the flow chart of FIGS. 13a and b, which shows the steps carried out by the computer system using software.

Either party may initiate the interaction. This sequence also shows the scenario where the user, instead of the computer system, is initiating the interaction.

Step 1301—User texts "UTILCO" to 12345
Step 1302—Is the device already enrolled?
Step 1303—No: Enter enrollment Sequence (FIG. 4)
Step 1304—Yes: Ask the use to confirm that they would like to log in to the mobile bill payment system
Step 1305—User texts 'Y' to confirm login
Step 1306—Have we received login confirmation?
Step 1307—No: Abort the login process
Step 1308—Yes: Queue phone call request with IVR subsystem
Step 1309—Dial phone and wait for an answer
Step 1310—Prompt for voice print phrase
Step 1311—Users repeats the voice print phrase
Step 1312—Does the voice print phrase match the user?
Step 1313—No: Notify user that voice print did not match (3 Max)
Alternate Step 1310—Prompt the user for the PIN code.
Alternate Step 1311—User enters PIN code.
Alternate Step 1312—Is the PIN code correct?
Alternate Step 1313—No: Notify User that the PIN code is not correct (3 Max)
Step 1314—Yes: Register successful session authentication
Step 1315—Hang up the call
Step 1316—Send text message containing bill information and payment options
Step 1317—User text 'P' to pay the bill immediately
Step 1318—Record payment authorization. Log payment transaction with financial transaction manager
Step 1319—Perform transaction settlement procedure
Step 1320—Was transaction settlement procedure successful?
Step 1321—No: Record transaction failure
Step 1322—Yes: Record successful transaction. Adjust customer balance.
Step 1323—Send text message notifying the user of the bill payment result and provide a menu of actions to take In the sequence, the alternate steps for 1310, 1311, 1312, and 1313 are used when voice fingerprinting is disabled.

Step 1319 above triggers the transaction settlement procedure. This procedure varies depending upon who is settling the transaction. The transaction may be settled directly by the mobile bill payment system using its relationships with the ACH network or payment processor. The transaction may alternatively be settled by the bill payment consolidator using its relationships with the ACH network or payment processor.

Figure 14:
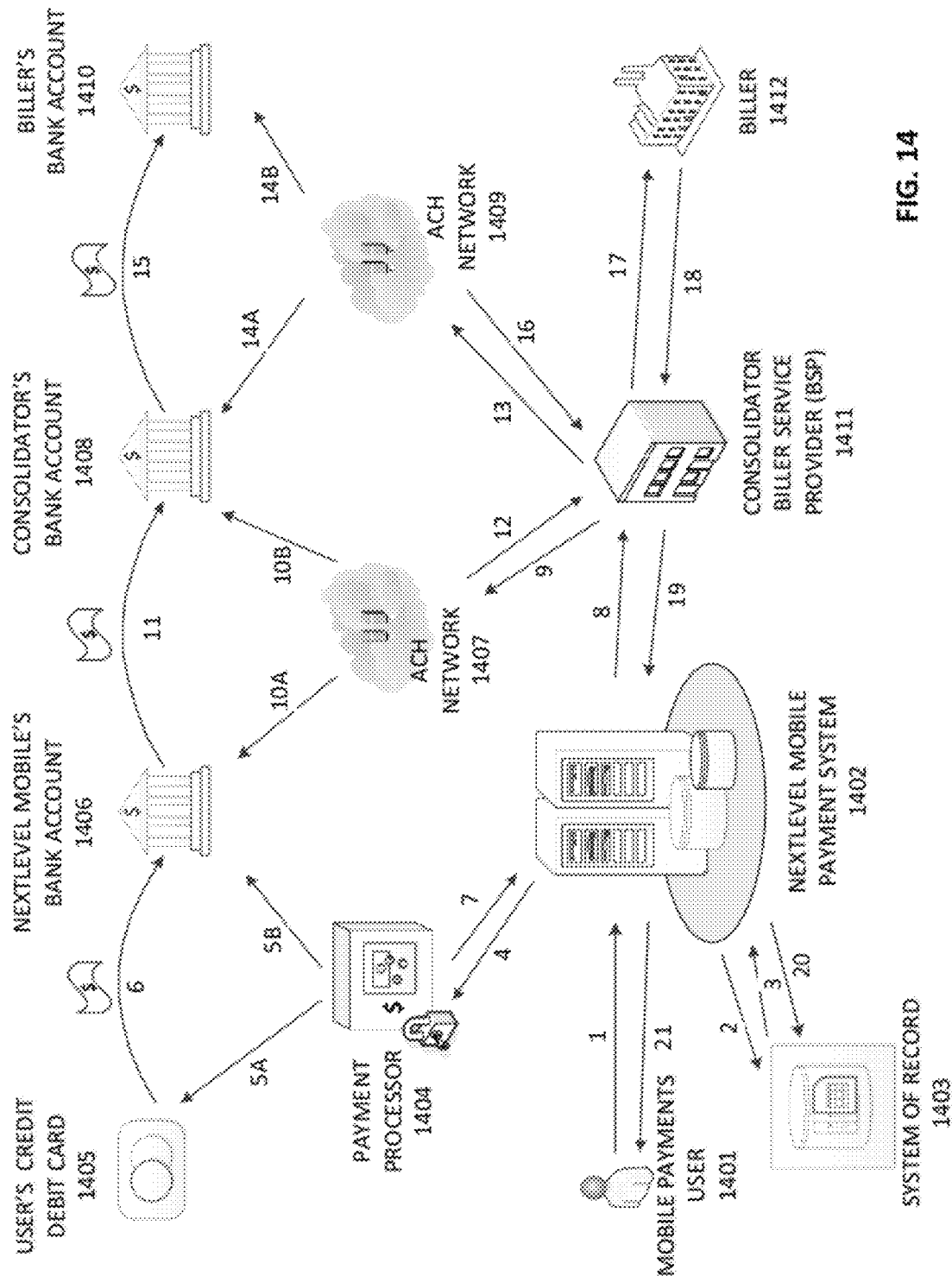
FIG. 14 illustrates schematically the steps handled by the computer system using software to generate, store and deliver electromagnetic data readable by the computer system when executing a credit/debit transaction settlement procedure processed by the mobile bill presentment and payment system.

The following sequence details the method of a credit/debit transaction settlement procedure processed by NextLevel Mobile, as depicted schematically by FIG. 14, which shows the steps carried out by the computer system using software.

Step 1. User 1401 sends payment authorization to Mobile Bill Payment System 1402.
Step 2. Mobile Bill Payment System 1402 logs 1403 payment authorization, adds convenience fee to the total transaction amount and creates pending transaction.
Step 3. Transaction manager 1403 reads pending transaction.
Step 4. NextLevel Mobile Payment System 1402 sends a transaction request to its payment processor 1404 to debit the user's debit card or charge the user's credit card.
Step 5. (a/b) The payment processor 1404 debits/charges the user's credit/debit card account 1405 and credits NextLevel Mobile's bank account 1406.
Step 6. Funds are moved from user's credit/debit card 1405 to NextLevel Mobile's bank account 1406.
Step 7. The payment processor 1404 notifies NextLevel Mobile 1402 of a successful transaction.
Step 8. NextLevel Mobile 1402 posts a payment notification to the consolidator 1411, along with the payment amount, the biller identifier, the customer account identifier, and the routing number and account number of the account holding the funds.
Step 9. The consolidator 1411 posts an ACH transaction to the Automated Clearing House Network 1407 to move the indicated funds into its bank account.
Step 10. (a/b) Nextlevel Mobile's bank account 1406 is debited by the amount indicated by the ACH 1407 posting. The consolidator's bank account 1408 is credited by the amount indicated by the ACH 1407 posting.
Step 11. Funds are moved from Nextlevel Mobile's bank account 1406 to the consolidator's bank account 1408.
Step 12. The ACH network 1407 notifies the consolidator 1411 of a successful transaction.
Step 13. The consolidator 1411 posts an ACH 1409 transaction to the Automated Clearing House Network to move the indicated funds from its bank account 1408 into the bank account 1410 of the Biller.
Step 14. (a/b) consolidator's bank account 1408 is debited by the amount indicated by the ACH 1409 posting. The biller's bank account 1410 is credited by the amount indicated by the ACH 1409 posting.
Step 15. Funds are moved from the consolidator's bank account 1408 to the Biller's bank account 1410.
Step 16. The ACH network 1409 notifies the consolidator 1411 of a successful transaction.
Step 17. The consolidator 1411 notifies biller 1412 of the posted payment.
Step 18. The consolidator 1411 receives confirmation of the registered posted payment 1412.
Step 19. The consolidator 1411 sends NextLevel Mobile 1402 confirmation of successful posted payment.
Step 20. NextLevel Mobile system 1402 logs 1403 the successful payment posting and updates records by transforming the data in its servers.
Step 21. NextLevel Mobile 1402 sends the user 1401 confirmation of successful payment.

Figure 15:
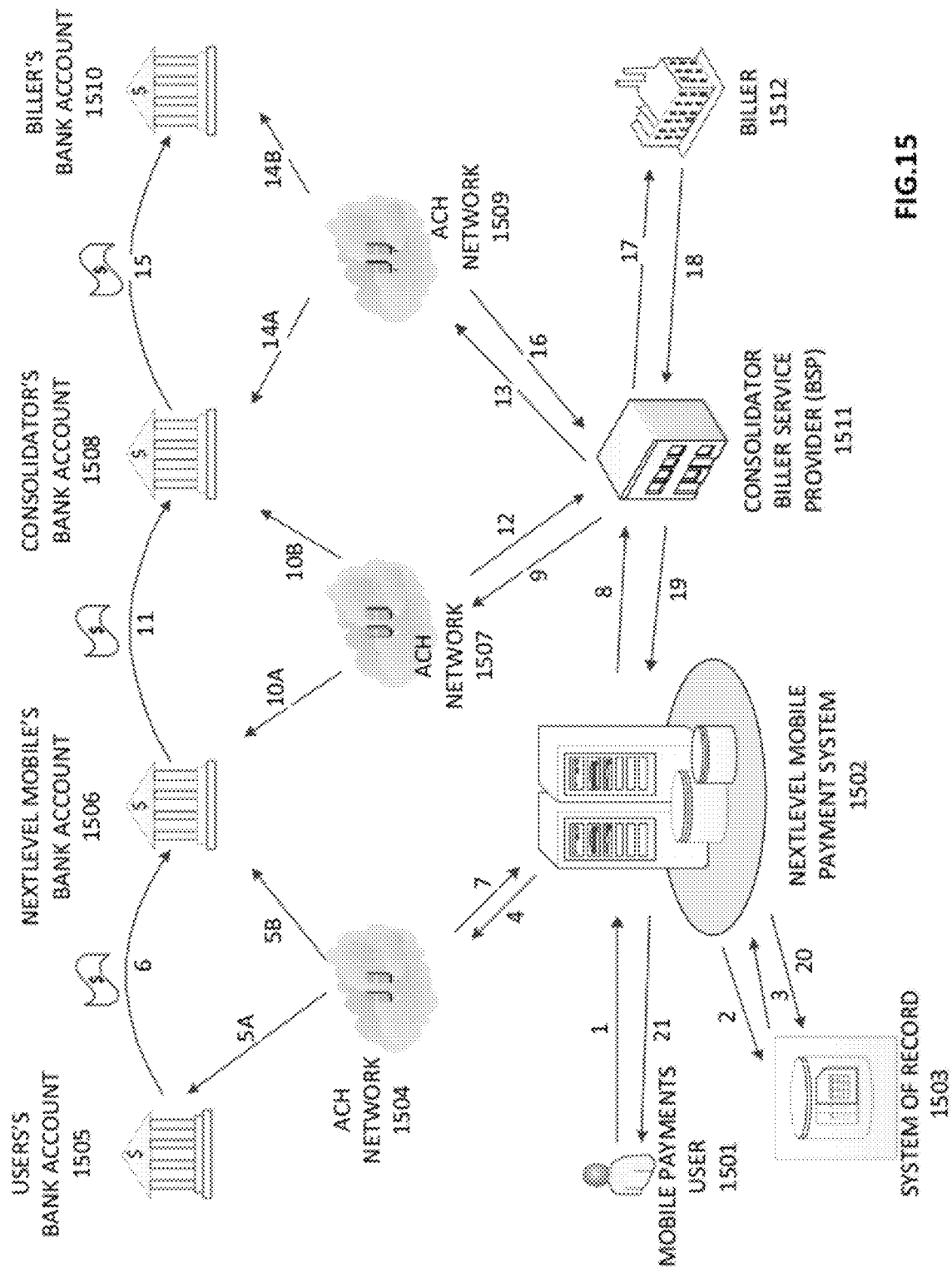
FIG. 15 illustrates schematically the steps handled by the computer system using software to generate, store and deliver electromagnetic data readable by the computer system when executing an ACH transaction settlement procedure processed by the mobile bill presentment and payment system.

The following sequence details the method of an ACH transaction settlement procedure processed by NextLevel Mobile, as depicted by FIG. 15, which shows the steps carried out by the computer system using software.

Step 1. User 1501 sends payment authorization to Mobile Bill Payment System 1502.

Step 2. Mobile Bill Payment System 1502 logs 1503 payment authorization, adds convenience fee to the total transaction amount and creates pending transaction.

Step 3. Transaction manager 1503 reads pending transaction.

Step 4. NextLevel Mobile 1502 posts an ACH transaction to the Automated Clearing House Network 1504 to move the indicated funds into its bank account 1506.

Step 5. (a/b) The user's bank account 1505 is debited by the amount indicated by the ACH 1504 posting. NextLevel Mobile's bank account 1506 is credited by the amount indicated by the ACH 1504 posting.

Step 6. Funds are moved from user's bank account 1505 to NextLevel Mobile's bank account 1506.

Step 7. The ACH network 1504 notifies NextLevel Mobile 1506 of a successful transaction.

Step 8. NextLevel Mobile 1506 posts a payment notification to the consolidator 1511, along with the payment amount, the biller identifier, the customer account identifier, and the routing number and account number of the account holding the funds.

Step 9. The consolidator 1511 posts an ACH transaction to the Automated Clearing House Network to move the indicated funds into its bank account 1508.

Step 10. (a/b) Nextlevel Mobile's bank account 1506 is debited by the amount indicated by the ACH 1507 posting. The consolidator's bank account 1508 is credited by the amount indicated by the ACH 1507 posting.

Step 11. Funds are moved from Nextlevel Mobile's bank account 1506 to the consolidator's bank account 1508.

Step 12. The ACH network 1507 notifies the consolidator 1511 of a successful transaction.

Step 13. The consolidator 1511 posts an ACH transaction to the Automated Clearing House Network 1509 to move the indicated funds from its bank account 1508 into the bank account of the Biller 1510.

Step 14. (a/b) consolidator's bank account 1508 is debited by the amount indicated by the ACH 1509 posting. The biller's bank account 1510 is credited by the amount indicated by the ACH 1509 posting.

Step 15. Funds are moved from the consolidator's bank account 1508 to the Biller's bank account 1510.

Step 16. The ACH network 1509 notifies the consolidator 1511 of a successful transaction.

Step 17. The consolidator 1511 notifies biller 1512 of the posted payment.

Step 18. The consolidator 1511 receives confirmation of the registered posted payment.

Step 19. The consolidator 1511 sends NextLevel Mobile 1502 confirmation of successful posted payment.

Step 20. NextLevel Mobile system 1502 logs the successful payment posting and updates records 1503.

Step 21. NextLevel Mobile 1502 sends the user 1501 confirmation of successful payment.

Figure 16:
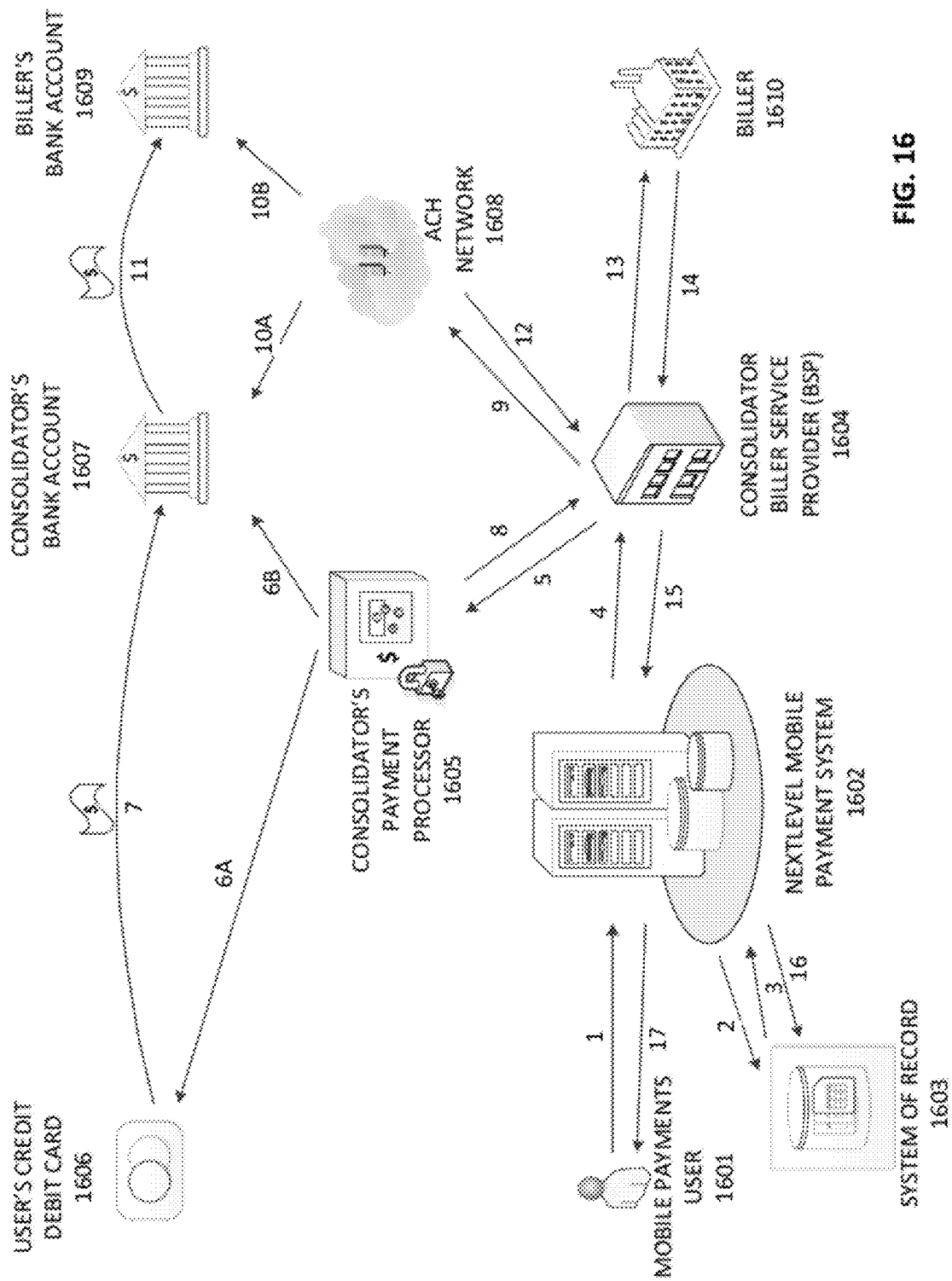
FIG. 16 illustrates schematically the steps handled by the computer system using software to generate, store and deliver electromagnetic data readable by the computer system and forwarding payment authorizations to a consolidator entity for executing a credit/debit transaction settlement procedure.

The following sequence details the method of a credit/debit transaction settlement procedure processed by the consolidator, as depicted by FIG. 16, which shows the steps carried out by the computer system using software.

Step 1. User 1601 sends payment authorization to Mobile Bill Payment System 1602.

Step 2. Mobile Bill Payment System 1602 logs 1603 payment authorization, adds convenience fee to the total transaction amount and creates pending transaction.

Step 3. Transaction manager 1603 reads pending transaction.

Step 4. NextLevel Mobile 1602 posts a payment notification to the consolidator 1604, along with the payment amount, the biller identifier, the customer account identifier, and the credit/debit card information identifier.

Step 5. The consolidator 1604 sends a transaction request to its payment processor 1605 to debit the user's debit card or charge the user's credit card.

Step 6. (a/b) The payment processor debits/charges the user's credit/debit card account 1606 and credits the consolidator's bank account 1607.

Step 7. Funds are moved from user's credit/debit card 1606 to the consolidator's bank account 1607.

Step 8. The payment processor 1605 notifies the consolidator 1604 of a successful transaction.

Step 9. The consolidator 1604 posts an ACH transaction to the Automated Clearing House Network 1608 to move the indicated funds from its bank account 1607 into the bank account of the Biller 1609.

Step 10. (a/b) consolidator's bank account 1607 is debited by the amount indicated by the ACH 1608 posting. The biller's bank account 1609 is credited by the amount indicated by the ACH 1608 posting.

Step 11. Funds are moved from the consolidator's bank account 1607 to the Biller's bank account 1609.

Step 12. The ACH network 1608 notifies the consolidator 1604 of a successful transaction.

Step 13. The consolidator 1604 notifies biller 1610 of the posted payment.

Step 14. The consolidator 1604 receives confirmation of the registered posted payment.

Step 15. The consolidator 1604 sends NextLevel Mobile 1602 confirmation of successful posted payment.

Step 16. NextLevel Mobile system 1602 logs the successful payment posting and updates records 1603.

Step 17. NextLevel Mobile 1602 sends the user 1601 confirmation of successful payment.

Figure 17:
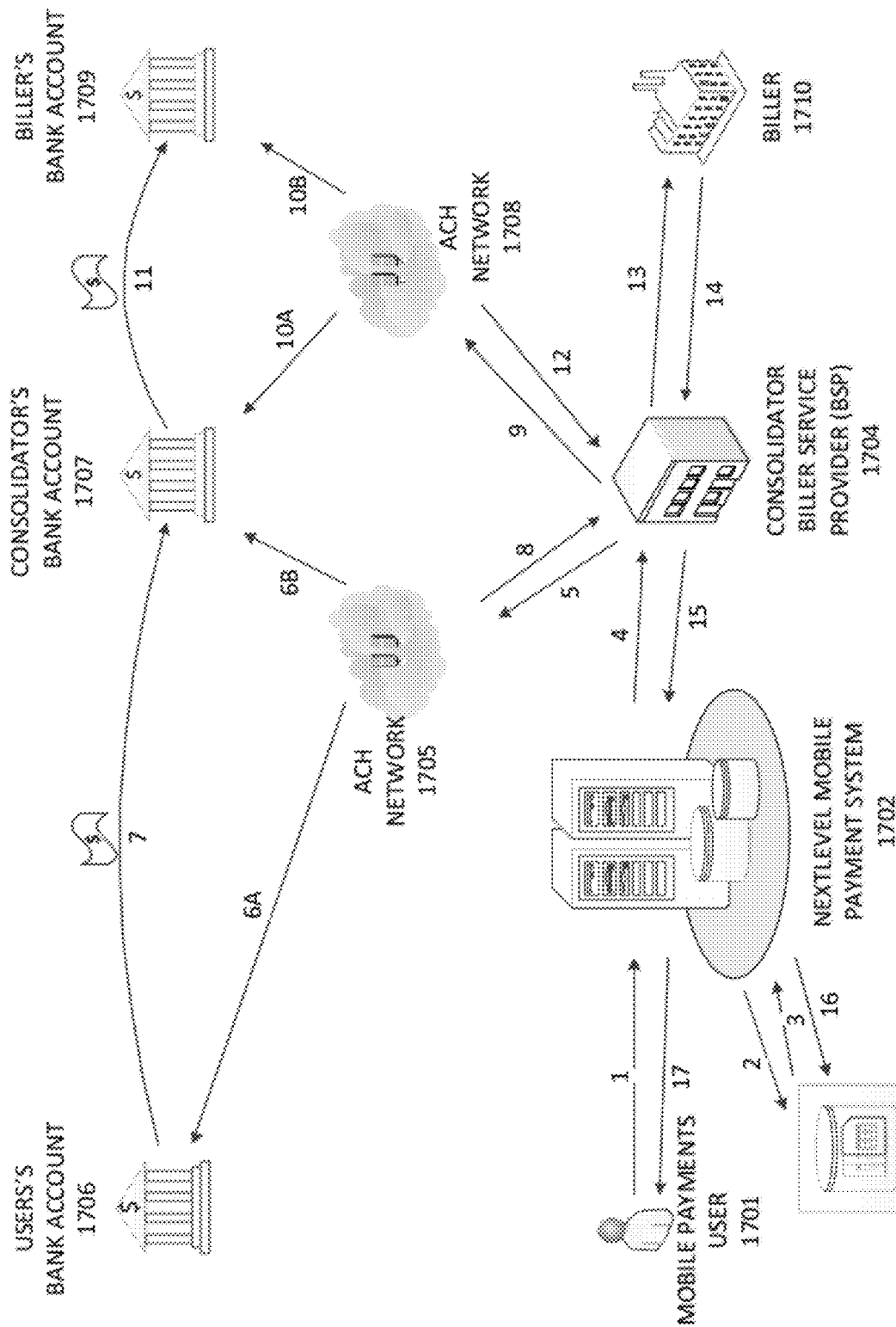
FIG. 17 illustrates schematically the steps handled by the computer system using software to generate, store and deliver electromagnetic data readable by the computer system and forwarding payment authorizations to a consolidator entity for executing an ACH transaction settlement procedure.

The following sequence details the method of an ACH transaction settlement procedure processed by the consolidator, as depicted by FIG. 17, which shows the steps carried out by the computer system using software.

Step 1. User 1701 sends payment authorization to Mobile Bill Payment System 1702.

Step 2. Mobile Bill Payment System 1702 logs 1703 payment authorization, adds convenience fee to the total transaction amount and creates pending transaction.

Step 3. Transaction manager 1703 reads pending transaction.

Step 4. NextLevel Mobile 1702 posts a payment notification to the consolidator 1704, along with the payment amount, the biller identifier, the customer account identifier, and the routing number and account number of the account holding the funds.

Step 5. The consolidator 1704 posts an ACH transaction to the Automated Clearing House Network 1705 to move the indicated funds from the user's bank account 1706 into its bank account 1707.

Step 6. (a/b) The user's bank account 1706 is debited by the amount indicated by the ACH 1705 posting. The consolidator's bank account 1707 is credited by the amount indicated by the ACH 1705 posting.

Step 7. Funds are moved from the user's bank account 1706 to the consolidator's bank account 1707.

Step 8. The ACH network 1705 notifies the consolidator 1704 of a successful transaction.

Step 9. The consolidator 1704 posts an ACH transaction to the Automated Clearing House Network 1705 to move the indicated funds from its bank account 1707 into the bank account of the Biller 1709.

Step 10. (a/b) consolidator's bank account 1707 is debited by the amount indicated by the ACH 1705 posting. The biller's bank account 1709 is credited by the amount indicated by the ACH 1705 posting.

Step 11. Funds are moved from the consolidator's bank account 1707 to the Biller's bank account 1709.

Step 12. The ACH network 1705 notifies the consolidator 1704 of a successful transaction.

Step 13. The consolidator 1704 notifies biller 1710 of the posted payment.

Step 14. The consolidator 1704 receives confirmation of the registered posted payment.

Step 15. The consolidator 1704 sends NextLevel Mobile 1702 confirmation of successful posted payment.

Step 16. NextLevel Mobile 1702 system logs the successful payment posting and updates records 1703.

Step 17. NextLevel Mobile 1702 sends the user 1701 confirmation of successful payment.

In a specific embodiment the present invention implements a biller services web portal where the biller can create and send product or service informational notices to the cell phone or another mobile device of one or more of their customers that have enrolled with an operations center.

Figure 18:
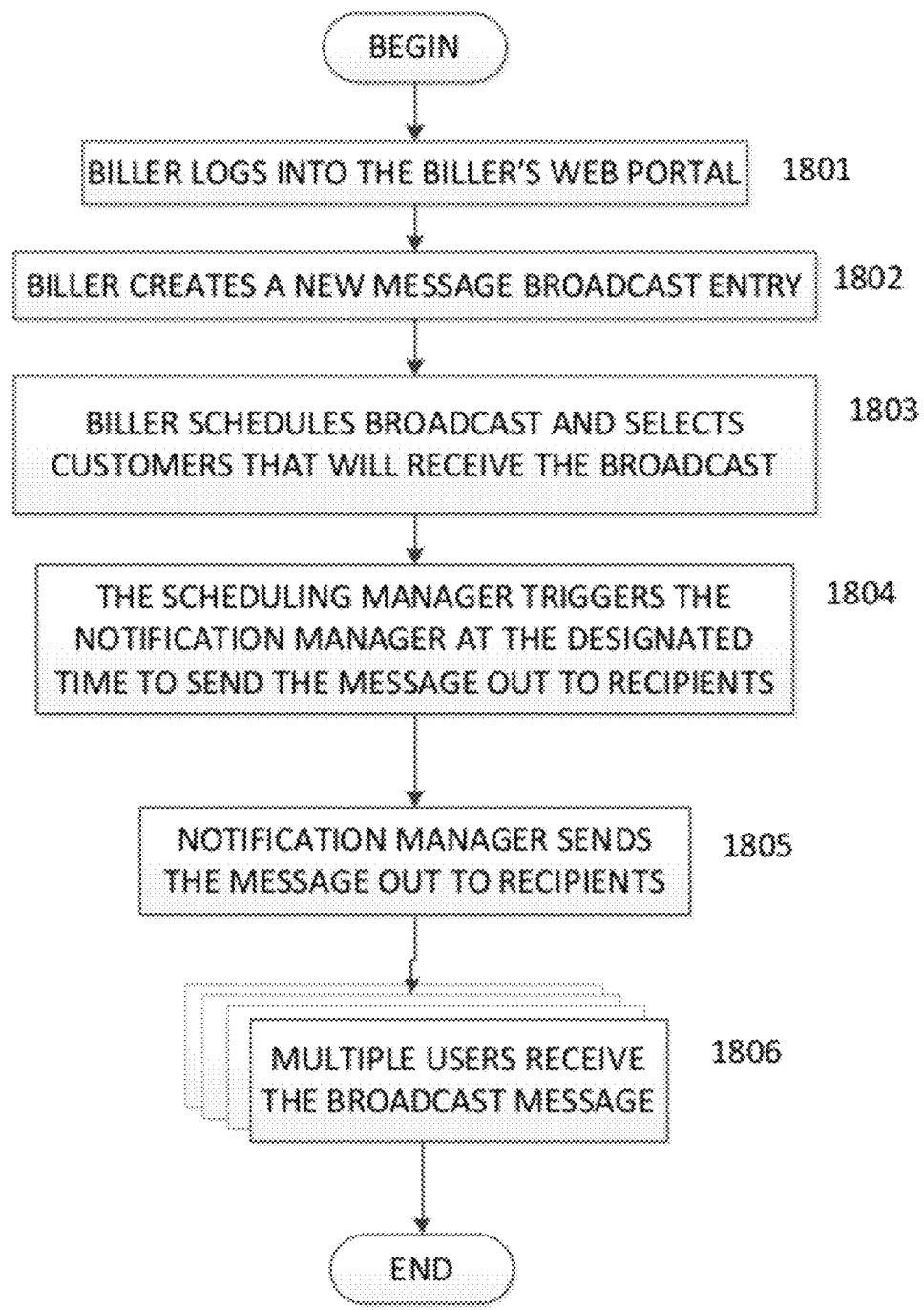
FIG. 18 illustrates a flow chart showing the steps handled by the computer system using software to generate, store and deliver electromagnetic data readable by the computer system when executing a broadcast of a biller entity's text message.

The following sequence details the method a of a biller text message broadcast, as depicted in a flow chart shown in FIG. 18, which shows the steps carried out by the computer system using software.

Step 1801—Biller logs into the biller's web portal

Step 1802—Biller creates a new message broadcast entry

Step 1803—Biller schedules broadcast and selects customers that will receive the broadcast Step 1804—The scheduling manager triggers the notification manager at the designated time to send the message out to recipients Step 1805—Notification manager send the message out to recipients Step 1806—Multiple users receive the broadcast message In a specific embodiment the present invention implements a biller services web portal where the biller can create and send an offer for a product or a service to be purchased to the cell phone or another mobile device of one or more of their customers that have enrolled with an operations center. Once the notice for the product or service is received, the user can purchase that product or service directly through their cell phone or another mobile device.

Figure 19A:
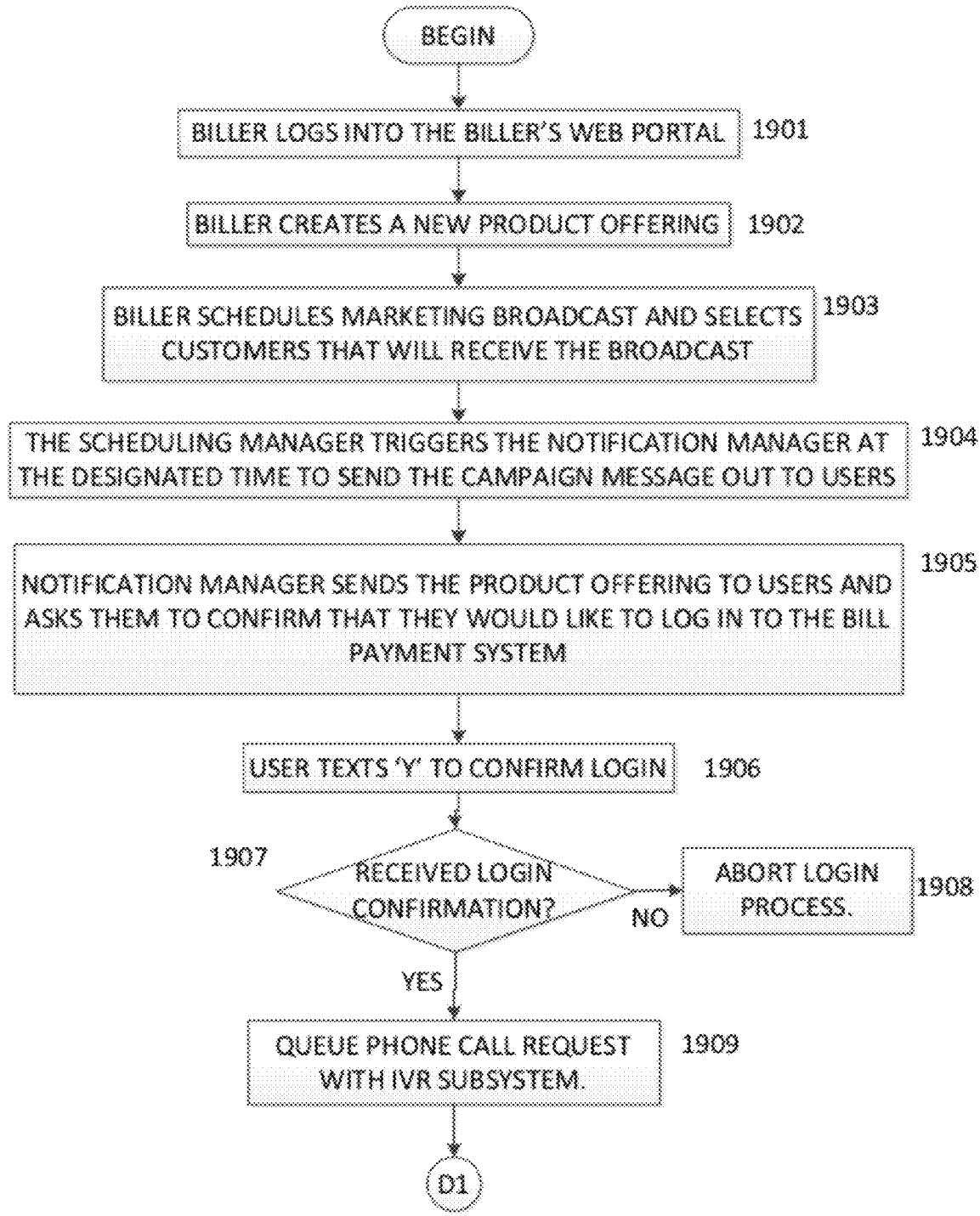
FIGS. 19a, b and c illustrate a flow chart showing the steps handled by the computer system using software to generate, store and deliver electromagnetic data readable by the computer system when executing a product marketing campaign using SMS & IVR interaction.
Figure 19B:
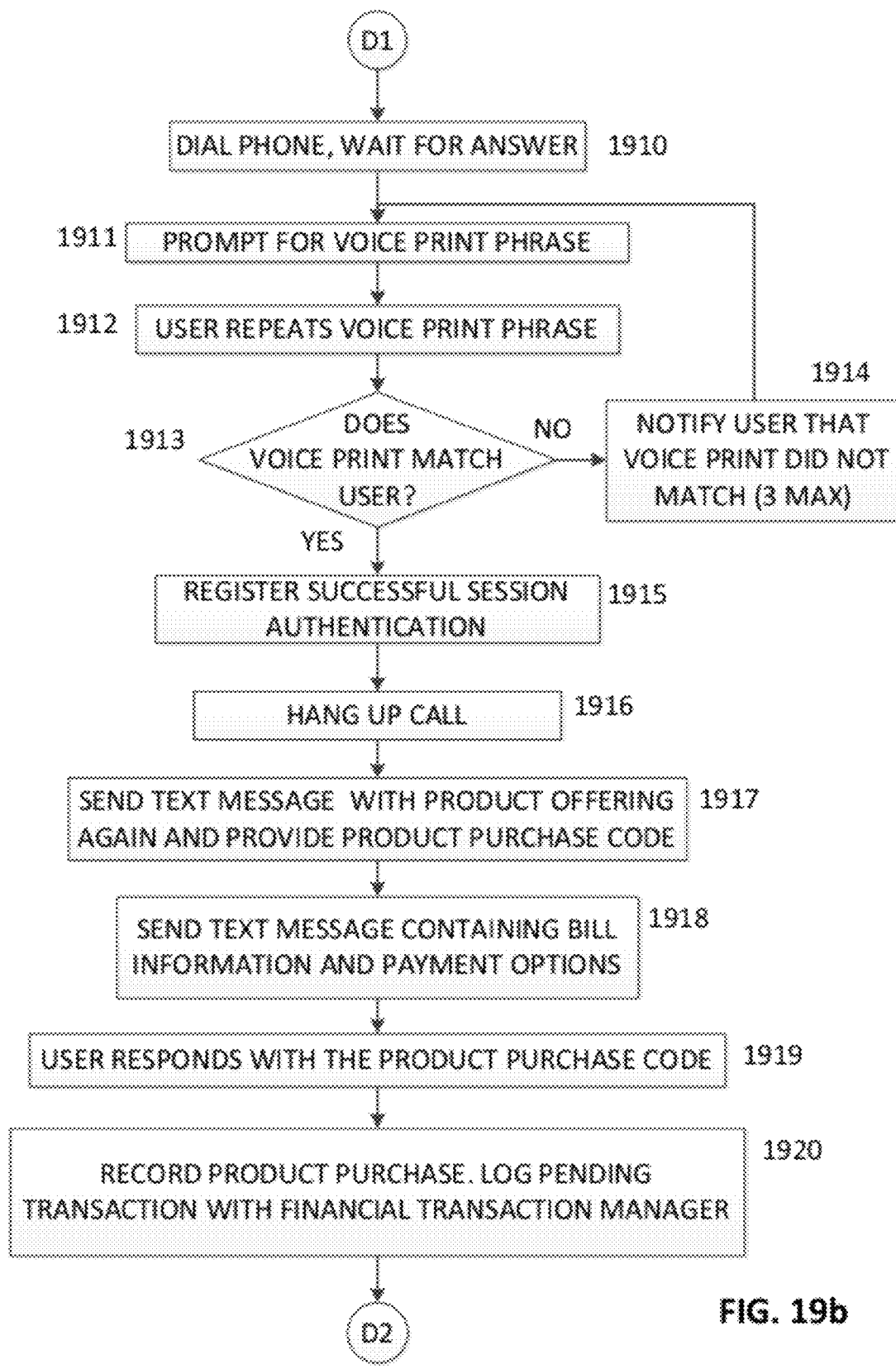
Figure 19C:
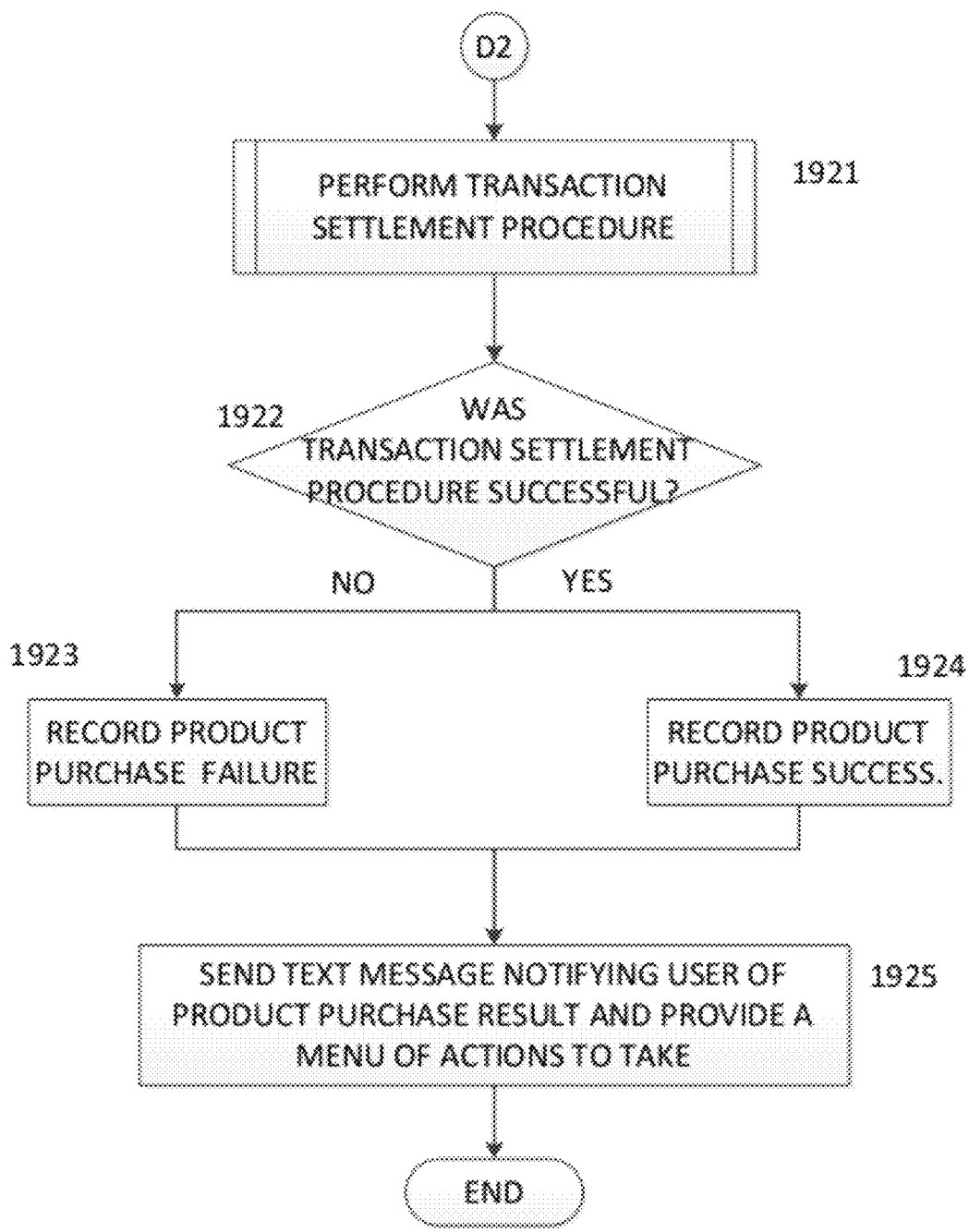

The following sequence details the method a of a biller marketing campaign using SMS & IVR interaction, as depicted in a flow chart shown in FIGS. 19*a*, *b* and *c*, which shows the steps carried out by the computer system using software.

Step 1901—Biller logs into the biller's web portal

Step 1902—Biller creates a new product offering

Step 1903—Biller schedules a marketing broadcast and selects the customers that will receive the broadcast Step 1904—The scheduling manager triggers the notification manager at the designated time to send the campaign message out to users Step 1905—The notification manager sends the product offering to users and asks them to confirm that they would like to log in to the bill payment system Step 1906—User texts 'Y' to confirm the login Step 1907—Have we received the login confirmation?

Step 1908—No: Abort the login process

Step 1909—Yes: Queue a phone call request with the IVR subsystem

Step 1910—Dial the phone number and wait for an answer

Step 1911—Prompt for the voice print phrase

Step 1912—User repeats the voice print phrase

Step 1913—Does the voice print match the user?

Step 1914—No: Notify the user that the voice print did not match (3 Max)

Alternate Step 1911—Prompt the user for the PIN code.

Alternate Step 1912—User enters PIN code.

Alternate Step 1913—Is the PIN code correct?

Alternate Step 1914—No: Notify User that the PIN code is not correct (3 Max)

Step 1915—Yes: Register successful session authentication

Step 1916—Hang up the call

Step 1917—Send text message with product offering again and provide product purchase code Step 1918—Send text message containing bill information and payment options Step 1919—User responds with the product purchase code Step 1920—Record the product purchase. Log pending transaction with the financial transaction manager Step 1921—Perform the transaction settlement procedure Step 1922—Was the transaction settlement procedure successful?

Step 1923—No: Record the product purchase failure

Step 1924—Yes: Record the product purchase success

Step 1925—Send a text message notifying the user of the product purchase result and provide a menu of action to take In the sequence, the alternate steps for 1911, 1912, 1913, and 1914 are used when voice fingerprinting is disabled.

The computer system and method of operating the computer system for electronic bill presentment and payment is convenient, and easy to use. The consumer is not required to mail in checks or make trips to a payment center and not required to have a computer connected to the Internet to get presentment and make bill payments. Also, the computer system and method results in payments posted fast and secure. The computer system and method enable bill presentment and payment capabilities via a unified mobile phone interface with a simple to use interaction. A consumer no longer needs to write checks, spend money on stamps or make trips to a bill payment center. The computer system and method works with any SMS capable cell phone and provides the greatest reach across all mobile users, and offers benefits such as the "anytime" and "anywhere" delivery of bills. A consumer can view and pay a bill wherever the customer is, at any time, without the need to access to the Internet.

The computer system and method of operating the computer system is also secure. The usage of IVR technology for the collection of secure data makes it perfectly safe. Even if a consumer loses the cell phone, anyone that finds it will not be able to make transactions and affect the consumer's financial health. Because of the consumer reach of the mobile platform upon which it is built, the system and method of the present invention also offers billers a way to access its consumer base in the format of messaging services. Messages can be simply informative or can be a marketing message for goods or services.

Accordingly the computer system and method of operating the computer system provide a mobile payment system and method wherein a biller's customers can register one or more payment methods in a secure manor using a cell phone or another mobile device. An enrolled user can receive bill presentment directly to a cell phone or other mobile device. Once the bill is presented, the user can pay that bill from the cell phone or another mobile device using one of the registered payment methods and receive confirmation of payment directly back to the cell phone or another mobile device. The user may choose to pay in full immediately, make a partial payment immediately, or make a full or partial payment on a specified date. The results of the authorized payment are sent back to the user's cell phone or other mobile device.

A biller can create and send product or service informational notices to the cell phone or another mobile device of one or more of their customers that have enrolled with an operations center. A biller can create and send an offer for a product or a service to be purchased to the cell phone or another mobile device of one or more of their customers that have enrolled with an operations center. Once the notice for the product or service is received, the user can purchase that product or service directly through their cell phone or another mobile device.

The computer system and method of operating the computer system provide a secure way of capturing sensitive information in an SMS text messaging based application from a cell phone, wherein sensitive or private data is collected from the user using an interactive voice response (IVR) based system and method.

The detailed description herein referenced to the accompanying drawings shows specific computer systems and methods of operating the computer systems. One skilled in the relevant art will recognize, however, that changes and modifications will be apparent to persons of ordinary skill in the art that do not depart from the spirit, scope and teachings herein. Such changes and modifications are deemed to fall within the purview of the appended claims.

What is claimed is:

1. A method comprising the steps of:
   A. establishing a mobile bill presentment and payment system having a computer processor, input-output and memory; said system acting for and in communication with a plurality of service providers, and in communication with, for each provider of services, with at least one biller of services and payment processor directly or via a consolidator acting on behalf of each said service provider, and further in communication with financial institutions and automatic clearing houses used by said service provider;
   B. configuring the mobile bill presentment and payment system to enable communication with each service provider's customers using a cell phone for purposes of bill presentment and payment;
   C. providing an interface in the system for communicating with each service provider's customers who have a cell phone with SMS text messaging and Interactive Voice Response (IVR) capabilities registered to a cellular provider and operable via a cellular network;
   D. registering a customer of a service provider, who is a bill payer, to the mobile bill presentment and payment system to enable bill presentment and payment by said customer following the steps of:
      i. initiating by a customer and sending to the mobile bill presentment and payment system a SMS text message containing an agreed keyword indicative of a specific service provider via customer's registered cell phone and cellular network;
      ii. receiving customer's SMS text message by the mobile bill presentment and payment system and determining if the mobile number sending the message has already gone through a first time enrollment process, and if not, then sending a text message back to customer notifying customer will receive a call shortly, and providing customer with a newly generated PIN and asking customer to grant permission to call by responding with a preselected affirmative indication;
      iii. sending a second SMS text message by customer to the mobile bill presentment and payment system of the preselected affirmative indication giving permission to call now via customer's registered cell phone and cellular network;
      iv. receiving customer's second SMS text message by the mobile bill presentment and payment system and determining if customer has responded with the preselected affirmative indication, and if not, abort the enrollment process, and if so, queuing a call request with an interface having IVR capability, and creating and storing a device object in the mobile bill presentment and payment system to represent the customer and associating the phone number of customer's cell phone to the device object;
      v. dialing customer's cell phone and when customer answers, initiating IVR and playing a greeting and asking for the PIN given in step ii.;
      vi. entering by customer the PIN given in step ii.;
      vii. if the PIN is correct, then generating a voice print sequence, and asking customer to provide secure identification by one of repeating a preselected voice print phrase and providing a permanent PIN;
      viii. repeating by customer of secure identification;
      ix. saving the secure identification in memory of the mobile bill presentment and payment system for future authentication responsive to customer repeating the secure identification correctly;
      x. creating an enrollment object in the mobile bill presentment and payment system for the customer and storing the secure identification in the newly created enrollment object and associating the enrollment object with the created device object;
      xi. prompting customer for customer's account number;
      xii. providing by customer of customer's account number for the specific service provider;
      xiii. determining by the mobile bill presentment and payment system if the customer's account number is correct and if so, the account number is stored with customer's phone number and an activation object is created and associated with the specific service provider in the mobile bill presentment and payment system;
      xiv. prompting customer to select and enter a payment method;
      xv. entering by customer selected payment method;
      xvi. prompting customer to enter checking account information or credit or debit card information, as appropriate, to support payment method selected;
      xvii. receiving customer's payment information and creating a payment object and associating it with the enrollment object;
      xviii. transmitting customer's payment method and information to a payment processor, which is also a PCI Level 1 Compliant datacenter acting on behalf of the service provider, and storing the payment information at the payment processor;
      xix. playing successful registration message to customer, terminating the phone call, and sending successful registration message via text message;
   xx. receiving by the mobile bill presentment and payment system valid instructions from a registered customer for payment of a presented bill according to payment method given during registration; and
   xxi. initiating a payment transaction by the mobile bill presentment and payment system for a bill presented to the customer for which customer desires to make a payment and is in contact by mobile phone with the mobile bill presentment and payment system for this purpose and given payment instructions, said mobile bill presentment and payment system communicating via a computer controlled network with at least a biller for the service provider and the payment processor acting on behalf of the service provider and any financial institutions according to the selection by customer of the payment method, to initiate and carry out the payment instructed to be made by the customer, and reporting the result of the payment via the mobile device of customer.

2. The method of claim 1 wherein step xxi. is further carried out by said mobile bill presentment and payment system receiving bill presentment information of a new bill from a service provider; updating its records by said mobile bill presentment and payment system and queuing notification action for communicating with customer; notifying customer that a new bill is pending and asking if customer wants to log in to see or pay the bill; responsive to customer texting an affirmative, said mobile bill presentment and payment system queuing a phone call request with the IVR activation; dialing customer and when answers, prompting for secure identification; if customer provides secure identification correctly, said mobile bill presentment and payment system registers successful session authentication; whereupon said mobile bill presentment and payment system terminates the call and sends the customer a text message containing bill information and payment options.

3. The method of claim 2 wherein step xxi is further carried out by customer, responsive to successful session authentication and receiving bill information and payment options, initiating communicating by sending a SMS message to said mobile bill presentment and payment system containing a word keyword indicative of a specific service provider and a code indicative of a desire to pay an outstanding bill via customer's registered cell phone and cellular network; said mobile bill presentment and payment system logging payment transaction and performing transaction settlement procedure, and if successful adjusting customer balance and sending text message notifying customer of bill payment result.

4. A system comprising:
A. a mobile bill presentment and payment system having a computer processor, input-output and memory; said system acting for and in communication with a plurality of service providers, and in communication with, for each provider of services, with at least one biller of services and payment processor directly
or via a consolidator acting on behalf of each said service provider, and further in communication with financial institutions and automatic clearing houses used by said service provider;
B. the mobile bill presentment and payment system configured to enable communication with each service provider's customers using a cell phone for purposes of bill presentment and payment;
C. an interface with SMS text messaging and Interactive Voice Response (IVR) capabilities in the operation center for communicating with each service provider's customers who have a cell phone registered to a cellular provider and operable via a cellular network;
D. the processor of the mobile bill presentment and payment system being programmed by non-transient instructions stored in the memory to control operation of the processor to register a customer of a service provider, who is a bill payer, to the mobile bill presentment and payment system to enable bill presentment and payment by said customer according to the following:
i. initiating by a customer and sending to the mobile bill presentment and payment system a SMS text message containing an agreed keyword indicative of a specific service provider via customer's registered cell phone and cellular network;
ii. receiving customer's SMS text message by the mobile bill presentment and payment system and determining if the mobile number sending the message has already gone through a first time enrollment process, and if not, then sending a text message back to customer notifying customer will receive a call shortly, and providing customer with a newly generated PIN and asking customer to grant permission to call by responding with a preselected affirmative indication;
iii. sending a second SMS text message by customer to the mobile bill presentment and payment system of the preselected affirmative indication giving permission to call now via customer's registered cell phone and cellular network;
iv. receiving customer's second SMS text message by the mobile bill presentment and payment system and determining if customer has responded with the preselected affirmative indication, and if not, abort the enrollment process, and if so, queuing a call request with an interface having IVR capability, and creating and storing a device object in the mobile bill presentment and payment system to represent the customer and associating the phone number of customer's cell phone to the device object;
v. dialing customer's cell phone and when customer answers, initiating IVR and playing a greeting and asking for the PIN given in step ii.;
vi. entering by customer the PIN given in step ii.;
vii. if the PIN is correct, then generating a voice print sequence, and asking customer to provide secure identification by one of repeating a preselected voice print phrase and providing a permanent PIN;
viii. repeating by customer the secure identification;
ix. saving the secure identification in memory of the mobile bill presentment and payment system for future authentication responsive to customer repeating the secure identification correctly;
x. creating an enrollment object in the mobile bill presentment and payment system for the customer and storing the secure identification and also storing in the newly created enrollment object and associating the enrollment object with the created device object;
xi. prompting customer for customer's account number;
xii. providing by customer of customer's account number for the specific service provider;
xiii. determining by the mobile bill presentment and payment system if the customer's account number is correct and if so, the account number is stored with customer's phone number and an activation object is created and associated with the specific service provider in the mobile bill presentment and payment system;
xiv. prompting customer to select and enter a payment method;
xv. entering by customer selected payment method;
xvi. prompting customer to enter checking account information or credit or debit card information, as appropriate, to support payment method selected;

xvii. receiving customer's payment information and creating a payment object and associating it with the enrollment object;

xviii. transmitting customer's payment method and information to a payment processor, which is also a PCI Level 1 Compliant datacenter acting on behalf of the service provider, and storing the payment information at the payment processor;

xix. playing successful registration message to customer, terminating the phone call, and sending successful registration message via text message;

xx. receiving by the mobile bill presentment and payment system valid instructions from a registered customer for payment of a presented bill according to payment method given during registration; and xxi. initiating a payment transaction by the mobile bill presentment and payment system for a bill presented to the customer for which customer desires to make a payment and is in contact by mobile phone with the mobile bill presentment and payment system for this purpose and given payment instructions, said mobile bill presentment and payment system communicating via a computer controlled network with at least a biller for the service provider and the payment processor acting on behalf of the service provider and any financial institutions according to the selection by customer of the payment method, to initiate and carry out the payment instructed to be made by the customer, and reporting the result of the payment via the mobile device of customer.

5. The system of claim 4 wherein D. xxi. is further carried out by said mobile bill presentment and payment system receiving bill presentment information of a new bill from a service provider; updating its records by said mobile bill presentment and payment system and queuing notification action for communicating with customer; notifying customer that a new bill is pending and asking if customer wants to log in to see or pay the bill; responsive to customer texting an affirmative, said mobile bill presentment and payment system queuing a phone call request with the IVR activation; dialing customer and when answers, prompting for secure identification; if customer provides secure identification correctly, said mobile bill presentment and payment system registers successful session authentication; whereupon said mobile bill presentment and payment system terminates the call and sends the customer a text message containing bill information and payment options.

6. The system of claim 5 wherein D. xxi. is further carried out by customer, responsive to successful session authentication and receiving bill information and payment options, initiating communicating by sending a SMS message to said mobile bill presentment and payment system containing an agreed keyword indicative of a specific service provider and a code indicative of a desire to pay an outstanding bill via customer's registered cell phone and cellular network; said mobile bill presentment and payment system logging payment transaction and performing transaction settlement procedure, and if successful, adjusting customer balance and sending text message notifying customer of bill payment result.

\* \* \* \* \*